United States Patent [19]

Knoll et al.

[11] Patent Number: 5,623,610
[45] Date of Patent: Apr. 22, 1997

[54] SYSTEM FOR ASSIGNING GEOGRAPHICAL ADDRESSES IN A HIERARCHICAL SERIAL BUS BY ENABLING UPSTREAM PORT AND SELECTIVELY ENABLING DISABLED PORTS AT POWER ON/RESET

[75] Inventors: Shaun Knoll, Portland, Oreg.; Jeff C. Morriss, Boulder Creek, Calif.; Shelagh Callahan, Beaverton, Oreg.; Ajay V. Bhatt, El Dorado Hills, Calif.; Sudarshan B. Cadambi, Portland, Oreg.

[73] Assignee: Intel Corporation, Santa Clara, Calif.

[21] Appl. No.: 332,375

[22] Filed: Oct. 31, 1994

[51] Int. Cl.$^6$ .............. G06F 12/00; G06F 12/02; G06F 13/38
[52] U.S. Cl. .............. 395/281; 395/285; 395/306; 395/290; 395/180; 364/228; 364/240; 364/241.1
[58] Field of Search .............. 364/240, 241.9, 364/242, 228, 241.1; 395/200, 280, 281, 282, 283, 287, 300, 425, 306, 285, 290, 180

[56] References Cited

U.S. PATENT DOCUMENTS

| | | | |
|---|---|---|---|
| 3,245,045 | 4/1966 | Randlev | 395/866 |
| 3,916,387 | 10/1975 | Woodrum | 395/800 |
| 3,932,841 | 1/1976 | Deerfield et al. | 395/287 |
| 4,070,704 | 1/1978 | Calle et al. | 364/200 |
| 4,092,491 | 5/1978 | Frazer | 375/283 |
| 4,409,656 | 10/1983 | Andersen et al. | 364/200 |
| 4,606,052 | 8/1986 | Hirzel et al. | 375/333 |
| 4,660,141 | 4/1987 | Ceccon et al. | 364/200 |
| 4,689,740 | 8/1987 | Moelands et al. | 395/550 |
| 4,713,834 | 12/1987 | Brahm et al. | 379/28 |
| 4,748,346 | 5/1988 | Emori | 326/90 |
| 4,870,704 | 9/1989 | Matelan et al. | 395/800 |
| 4,885,742 | 12/1989 | Yano | 370/85.2 |
| 4,912,633 | 3/1990 | Schweizer et al. | 364/200 |
| 4,914,650 | 4/1990 | Sriram | 370/60 |
| 4,984,190 | 1/1991 | Katori et al. | 395/200.05 |
| 5,001,707 | 3/1991 | Kositpaiboon | 370/94.1 |
| 5,063,574 | 11/1991 | Moose | 375/244 |
| 5,130,983 | 7/1992 | Heffner, III | 370/85.8 |
| 5,173,939 | 12/1992 | Abadi et al. | 380/25 |
| 5,179,670 | 1/1993 | Farmwald et al. | 395/325 |
| 5,237,690 | 8/1993 | Bealkowski et al. | 395/700 |
| 5,257,160 | 10/1993 | Yokohama et al. | 361/246 |
| 5,269,011 | 12/1993 | Yanai et al. | 395/425 |
| 5,282,202 | 1/1994 | Bernstein et al. | 370/94.1 |
| 5,317,597 | 5/1994 | Eisele | 375/257 |
| 5,341,131 | 8/1994 | Hoshini et al. | 340/825.12 |

(List continued on next page.)

OTHER PUBLICATIONS

Dean McCarron, Pulg-and Play Specification Introduced: Microsoft, Intel, Others Annouce User–Friendly ISA BUS, 7 Microprocessor Report 224 May 1993.

(List continued on next page.)

*Primary Examiner*—Thomas C. Lee
*Assistant Examiner*—Anderson I. Chen
*Attorney, Agent, or Firm*—Blakely, Sokoloff, Taylor & Zafman

[57] ABSTRACT

Circuitry and complementary logic are provided to a bus controller, a number of 1:n bus signal distributors, and a number of bus interfaces of an hierarchical serial bus assembly for the bus controller to dynamically detect and manage the interconnection topology of the serial bus elements. The serial bus assembly is used to serially interface a number of isochronous and asynchronous peripherals to the system unit of a computer system. These circuitry and complementary logic support an hierarchical view of the serial bus elements, logically dividing the hierarchy into multiple tiers. This logical view of the serial bus elements is used by the bus controller to detect the presence of interconnected serial bus elements and the functions of the bus agents, i.e. the system unit and the interconnected peripheral, as well as assignment of addresses to the serial bus elements and the functions, at power on, reset, and during operation when serial bus elements are hot attached to or detached from the serial bus assembly.

14 Claims, 15 Drawing Sheets

U.S. PATENT DOCUMENTS

| | | | |
|---|---|---|---|
| 5,341,480 | 8/1994 | Wasseman et al. | 395/325 |
| 5,361,261 | 11/1994 | Edem et al. | 370/85.3 |
| 5,379,384 | 1/1995 | Solomon | 395/325 |
| 5,386,567 | 1/1995 | Lien et al. | 395/700 |
| 5,394,556 | 2/1995 | Oprescu | 395/800 |
| 5,418,478 | 5/1995 | Van Brunt et al. | 326/86 |
| 5,440,181 | 8/1995 | Gruender, Jr. et al. | 307/156 |
| 5,440,556 | 8/1995 | Edem et al. | 370/79 |
| 5,446,765 | 8/1995 | Leger | 375/359 |
| 5,463,620 | 10/1995 | Sriram | 370/60 |
| 5,463,624 | 10/1995 | Hogg et al. | 370/85.6 |
| 5,483,518 | 1/1996 | Whetsel | 370/13 |
| 5,542,055 | 7/1996 | Amini et al. | 395/281 |

OTHER PUBLICATIONS

GLOBECOM'92: IEEE Global Telecommunications Conference; Sriram "Methodologies For Bandwidth Allocation, Transmission Scheduling, And Congestion Avoidance In Broadband ATM".

GLOBECOM'90: IEEE Global Telecommunications Conference; Aicardi, et al. "Adaptive Bandwidth Assignments In A TDM Network With Hybrid Frames", pp. 41–42.

Local Computer Networks, 1991 16th Conference, Issued 13 Mar. 1991, R. Bolla et al, "A traffic control strategy for a DQDB–type MAN", pp. 195–196.

Wireless Communications, Selected Topics, Int'l. conference 1992, Issued Feb. 1992, K. S. Natarajan, "A hybrid medium access Protocol for Wireless LANS", pp. 134–136.

IEEE Transactions on Communications, Z. Zhang et al, "Bounds on the mean system–size and Delay for a movable–boundary integrated circuit and packet switched communications".

GLOBECOM'92: IEEE Global Telecommunications Conference; Bolla et al. "A Neutral Strategy For Optimal Multiplexing Of Circuit–And Packet–Switched Traffic." 1992 pgs.

Philips' I C (Inter–Integrated Circuit) Bus, 5 pages.

Concentration Highway Interface (CHI), AT&T Microelectronics Interface Specification, Nov. 1990 (DS90–124SMOS).

ATA/ANSI 878.1, Version 1.9 (59 Sheets), Copyright 1992 ARCNET Trade Association.

PCMCIA PC Card Standard, Release 2.01, 1.1–4.8.9, Copyright 1992 PCMCIA.

ACCESS.bus™ Specifications—Version 2.2.

High Performance Serial Bus, P1394/Draft 6.2v0, Copyright 1993 IEEE.

SYSTEM FOR ASSIGNING GEOGRAPHICAL ADDRESSES IN A HIERARCHICAL SERIAL BUS BY ENABLING UPSTREAM PORT AND SELECTIVELY ENABLING DISABLED PORTS AT POWER ON/RESET

BACKGROUND OF THE INVENTION

1. Field of the Invention

The present invention relates to the field of computer systems. More specifically, the present invention relates to serial buses for connecting peripherals to the system units of computer systems, including the associated controllers and interfaces.

2. Background Information

A number of interrelated considerations is making it desirable to have a single, relatively fast, bi-directional, isochronous, low-cost, and dynamically configurable serial bus for simultaneously connecting isochronous as well as asynchronous peripherals to the system unit of a desktop computer system. Isochronous peripherals are peripherals that generate real time natural data such as voice, motion video, and the like. These interrelated considerations include:

Connection of the Telephone to the Desktop Computer

It is expected that the merging of computing and communication will be the basis of the next generation of productivity applications on desktop computers. The movement of machine oriented and human oriented data types from one location or environment to another depends on ubiquitous and cheap connectivity. Unfortunately, the computing and communication industries have evolved independently. As a result, a wide range of desktop computer and telephone interconnects have to be supported.

Ease of Use

The lack of flexibility in reconfiguring desktop computers has been acknowledged as its Achilles heel to it's further development. The combination of user friendly graphical interfaces and the hardware and software mechanisms associated with the new generation of system bus architectures have made desktop computers less confrontational and easier to reconfigure. However, from the enduser point of view, the desktop computer's I/O interfaces such as serial/parallel ports, keyboard/mouse/joystick interfaces, still lack the attributes of plug and play or too limiting in terms of the type of I/O devices that can be live attached/detached.

Port Expansion

The addition of external peripherals to desktop computers continues to be constrained by port availability. The lack of a bi-directional, low-cost, low to mid speed peripheral bus has held back the proliferation of peripherals like telephone/fax/modem adapters, answering machines, scanners, personal digital assistants (PDA), keyboards, mouses, etc. Existing interconnects are optimized for one or two point products. As each new function or capability is added to the desktop computer, typically a new interface has been defined to address this need.

In other words, this desired serial bus is expected to provide low cost simultaneous connectivity for the relatively low speed 10–100 kbps interactive devices such as keyboard, mouse, stylus, game peripherals, virtual reality peripherals, and monitors, as well as the moderate speed 500–5000 kbps isochronous devices such as ISDN, PBX, POTS, and other audio devices. A multiplicity of both types of devices are expected to be connected and active at the same time, and yet the latter type of devices are provided with guaranteed latencies and bandwidths. Furthermore, the devices are expected to be hot attached and detached, with the serial interface being able to dynamically reconfigure itself without interrupting operation of the desktop computer system.

There are several technologies that are commonly considered to be serial buses for connecting peripherals to system units of computer systems. Each of these buses is designed to handle a specific range of communications between system units and peripherals. Particular examples of these buses include:

Apple® Desktop Bus (ADB):

ADB is a proprietary bus of Apple Computer Inc. It is a minimalist serial bus that provides a simple read/write protocol to up to 16 devices. Only basic functions are required of the controller and interface hardware. Thus, the implementation cost is expected to be low. However, ADB supports data rates only up to 90 kbps, just enough to communicate with asynchronous desktop devices such as keyboards and mouses. It is not capable of simultaneously supporting the moderate speed isochronous devices discussed earlier.

Access.bus (A.b):

A.b is developed by the Access.bus Industry Group. It is based on the $I^2C$ technology of Philips Corporation and a software model of Digital Equipment Corporation (DEC). A.b is also designed primarily for asynchronous devices such as keyboards and mouses. However A.b is generally considered to be more versatile than ADB. A.b's protocol has well defined specifications for dynamic attach, arbitration, data packets, configuration and software interface. Moderate amount of functions are required of the controller and interface hardware. Thus, the implementation cost is only marginally competitive for the desired desktop application. While addressing is provided for up to 127 devices, the practical loading is limited by cable lengths and power distribution considerations. Revision 2.2 specifies the bus for 100 kbps operation, but the technology has headroom to go up to 400 kbps using the same separate clock and data wires. However, at 400 kbps, A.b still falls short in meeting the requirements of the moderate speed isochronous devices.

IEEE's P1394 Serial Bus Specification (aka FireWire):

FireWire is a high performance serial bus. It is designed primarily for hard disk and video peripherals, which may require bus bandwidth in excess of 100 Mbps. It's protocol supports both isochronous and asynchronous transfers over the same set of 4 signal wires, broken up as differential pairs of clock and data signals. Thus, it is capable of simultaneously meeting the requirements of low speed interactive as well as moderate speed isochronous devices. However, elaborate functions are required of the controller and interface hardware, rendering FireWire to be non-price competitive for the desired desktop application. Moreover, the first generation of devices, based on FireWire's specification, are only just becoming available in the market.

The Concentration Highway Interface (CHI):

CHI is developed by American Telephone & Telegraph Corporation (AT&T) for terminals and digital switches. It is a full duplex time division multiplexed serial interface for digitized voice transfer in a communication system. The protocol consists of a number of fixed time slots that can carry voice data and control information. The current specification supports data transfer rates up to 4,096 Mbps. The CHI bus has 4 signal wires: Clock, Framing, Receive Data, and Transmit Data. Both, the Framing and the Clock signals are generated centrally (i.e. PBX switch). Thus, it is also capable of simultaneously meeting the requirements of low speed interactive as well as the moderate speed isochronous devices. Similar to FireWire, elaborate functions are also required of the controller and interface hardware. As a result, CHI is also non-price competitive for the desired desktop application.

As will be disclosed in more detail below, the present invention provides the desired serial bus assembly, including its associated controller, bridging connectors and interfaces, that advantageously overcomes the limitations of the prior art serial buses in a novel manner.

SUMMARY OF THE INVENTION

The present invention includes circuitry and complementary logic provided to a bus controller, a number of 1:n bus signal distributors, and a number of bus interfaces of an hierarchical serial bus assembly for the bus controller to dynamically detect and manage the interconnection topology of the serial bus elements. The serial bus assembly is used to serially interface a number of isochronous and asynchronous peripherals to the system unit of a computer system. These circuitry and complementary logic support an hierarchical view of the serial bus elements, logically dividing the hierarchy into multiple tiers. This logical view of the serial bus elements is used by the bus controller to detect the presence of interconnected serial bus elements and the functions of the bus agents, i.e. the system unit and the interconnected peripheral, as well as assignment of addresses to the serial bus elements and the functions, at power on, reset, and during operation when serial bus elements are hot attached to or detached from the serial bus assembly.

Typically, the bus controller is disposed in the system unit, and the bus interfaces are disposed in the connecting peripherals, one bus interface per connecting peripheral. The peripherals, through their bus interfaces, are connected to the system unit, through the bus controller, using one or more bus signal distributors disposed in the system unit, stand alone bridging connectors and/or the connecting peripherals. A bus interface is always a termination point. Only a bus signal distributor may have one or more bus signal distributor(s) and/or bus interface(s) connected upstream to it. Together, the system unit, the serial bus elements, and the peripherals form an hierarchy of interconnected devices, with the system unit and its bus controller logically occupying a root tier, the first bus signal distributor connected to the bus controller logically occupying tier zero, the bus signal distributor(s) and/or the bus interface(s) and its/their "host" peripheral(s) connected to the first bus signal distributor logically occupying tier one, and so forth, and so forth.

A connecting peripheral may be an isochronous or an asynchronous peripheral. Furthermore, a connecting peripheral may be a multi-function peripheral, i.e. multiple functions being mapped to a single bus connection point serviced by a single bus interface.

At power on or reset, using the hierarchical view, the bus controller systematically detects the presence of the serial bus elements, and the functions of the interconnected peripherals, one logical tier at a time. As the presence of a serial bus element is detected, the bus controller assigns a geographical address to the serial bus element. Additionally, the bus controller systematically assigns a logical address to each function of each interconnected peripheral. Preferably, a bus signal distributor identity and its upstream port may be inferred from the bus signal distributor's assigned geographical address. Furthermore, the connecting bus signal distributor of a bus interface, including the connecting port, may be inferred from the geographical address assigned to the bus interface.

Similarly, during operation, using the hierarchical view, the bus controller systematically detects live attachment and detachment of serial bus elements, including the functions of the newly interconnected peripherals, one logical tier at a time. As the detachment of a serial bus element is detected, its geographical address is deassigned. If the detached serial bus element is a bus interface, the bus controller also deassigns the logical address(es) assigned to the function(s) of its "host" peripheral. Similarly, as the presence of a newly interconnected serial bus element is detected, the bus controller assigns a geographical address to the newly interconnected serial bus element. If the newly attached serial bus element is a bus interface, the bus controller also assigns a logical address to each function of the newly attached bus interface's "host" peripheral.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention.

Figure 1:
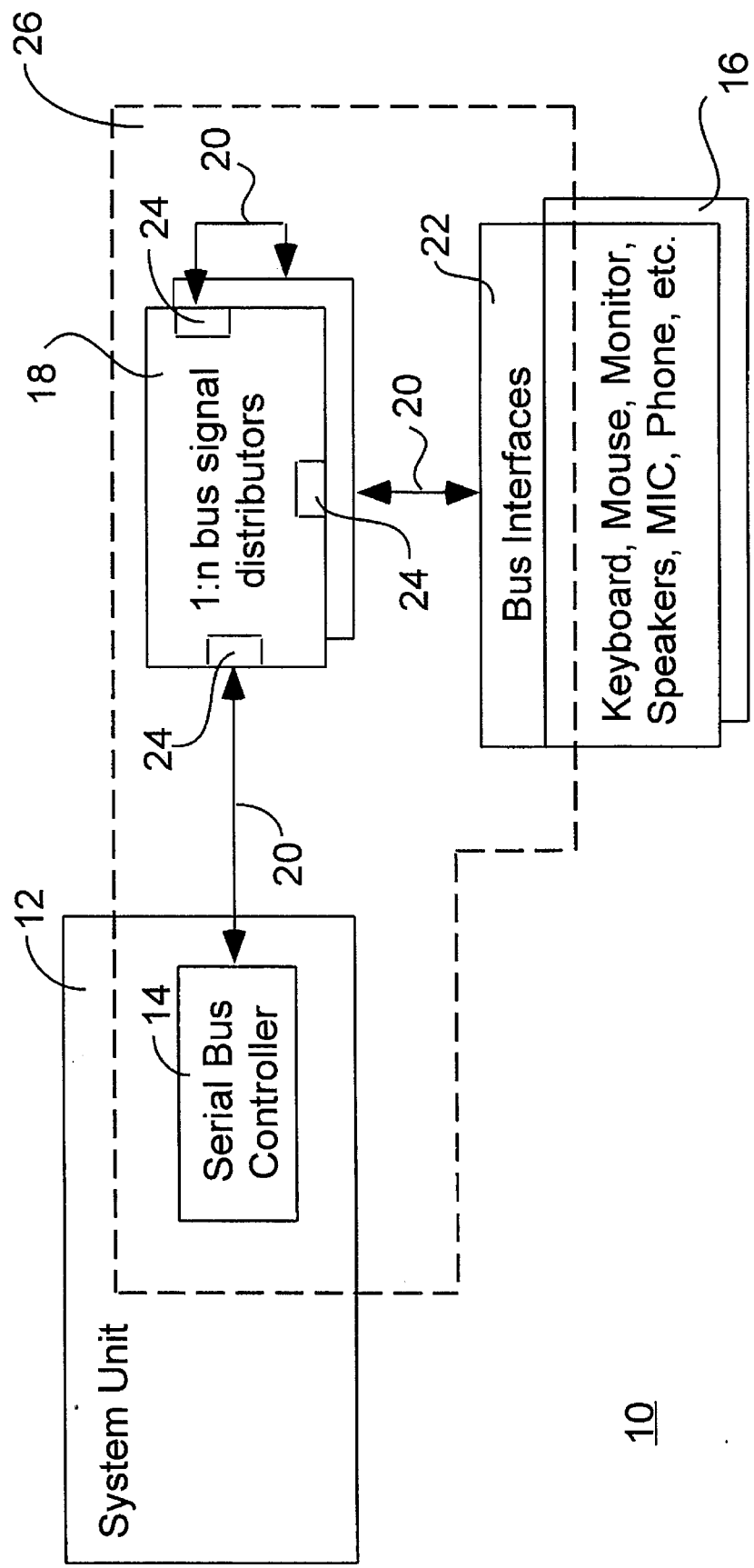
FIG. 1 illustrates an exemplary computer system incorporating the serial bus teachings of the present invention.

Hierarchical Serial Bus Assembly for Serially Interfacing Isochrononous and Asynchronous Peripherals to a System Unit of a Computer System Referring now to FIG. 1, a block diagram illustrating an exemplary computer system incorporating the serial bus teachings of the present invention is shown. Exemplary computer system 10 comprises system unit 12 having serial bus controller 14 of the present invention, 1:n bus signal distributors 18 of the present invention, each having n+1 ports 24, and peripherals 16 having bus interfaces 22 of the present invention. Peripherals 16 are coupled to bus controller 14 of system unit 12 through 1:n bus signal distributors 18 and preferably cables 20. Collectively, bus controller 14, bus signal distributors 18, bus interfaces 22, and cables 20 form a serial bus assembly 26 interconnecting bus agents, i.e. system unit 12 and peripherals 16 to each other.

Figure 7:
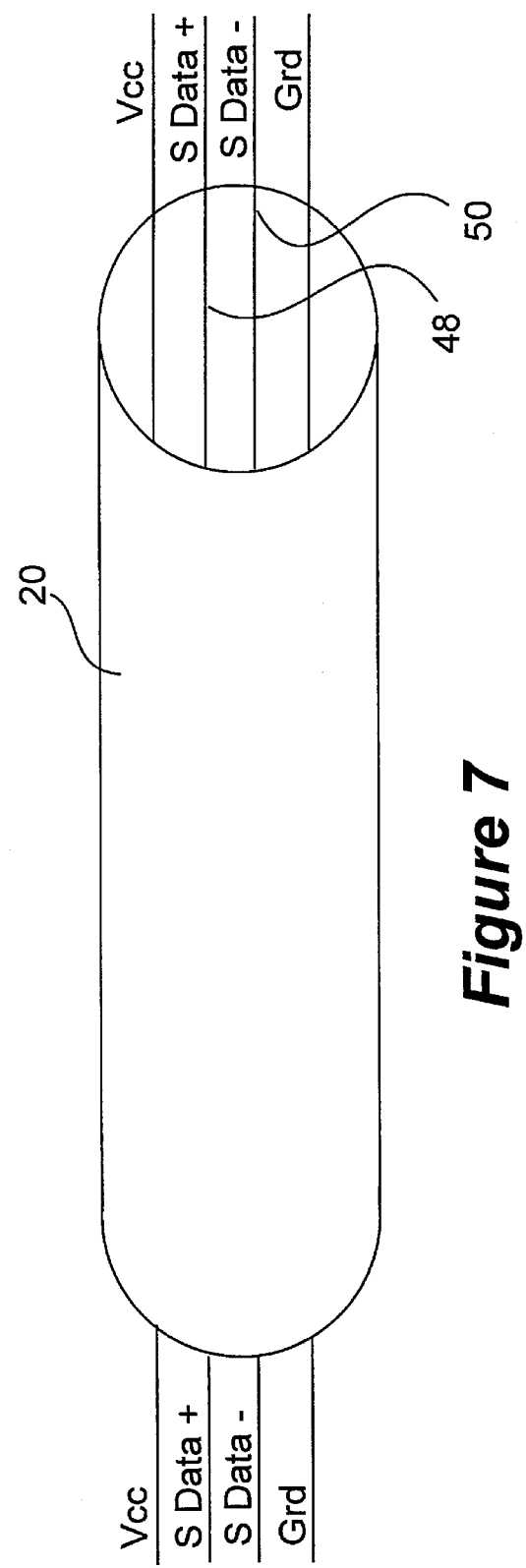
FIG. 7 illustrates one embodiment of the cables physically connecting the serial bus elements under the present invention.

Cables 20 are preferably low cost two signal wires cables 48 and 50 (as illustrated in FIG. 7). However, cables 20 are capable of supporting data transfer rates up to 5 Mbps. Furthermore, when such low cost cables 20 are employed, electrical signals are preferably propagated over the two signal wires 48 and 50 between the interconnected devices 14, 18 and 22 in a differential manner. For examples, a negative voltage differential represents a 1-bit and a positive voltage differential represents a 0-bit. For some embodiments, data and control states are further inferred from the electrical signals' voltage states and/or durations. A particular implementation of electrically represent data and control states with voltage states and/or signal durations is described in the contemporaneously filed copending application, Ser. No. 08/332,337, entitled Method And Apparatus For Serial Bus Elements Of An Hierarchical Serial Bus To Electrically Represent Data And Control States To Each Other, which is hereby fully incorporated by reference.

Except for bus controller 14, system unit 12 is intended to represent a broad category of system units of computer systems whose constitutions and functions are well known, and will not be otherwise further described. Similarly, except for bus interfaces 22, peripherals 16 are intended to represent a broad category of desktop peripherals, such as keyboards, mouses, monitors, speakers, microphone, telephones, whose constitutions and functions are also well known, and will not be otherwise further described either. Bus controller 14, bus signal distributors 18 and bus interfaces 22 will be described in more detail below with additional references to the remaining figures.

Figure 2:
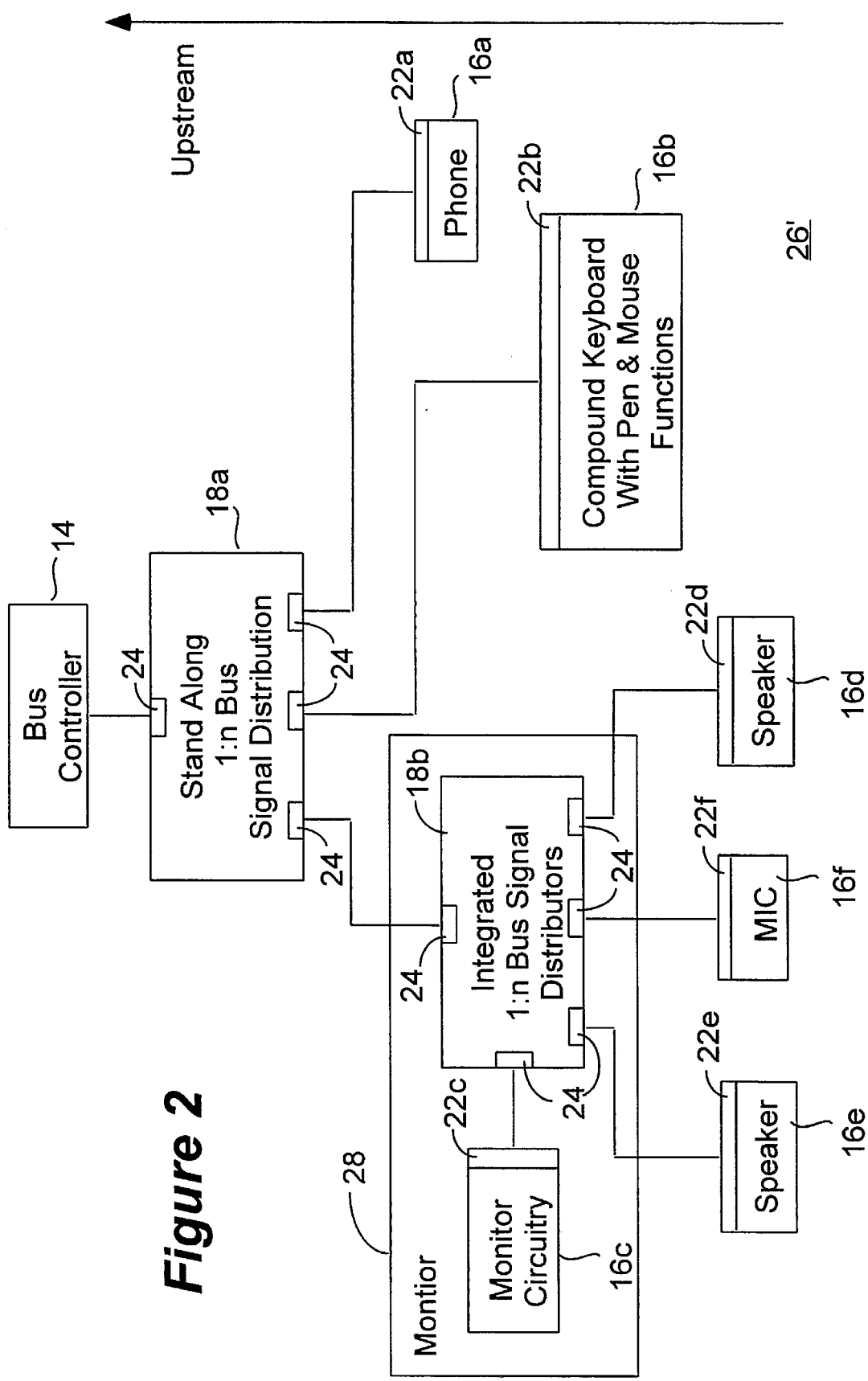
FIG. 2 illustrates one embodiment of the serial bus assembly of FIG. 1 in further detail.

FIG. 2 illustrates one embodiment of the serial bus assembly of FIG. 1 in further detail. For this embodiment, serial bus assembly 26' includes serial bus controller 14, standalone 1:n bus signal distributor 18a, integrated 1:n bus signal distributor 18b, and bus interfaces 22a–22f. The serial bus assembly 26' interconnects bus agents telephone 16a, compound keyboard 16b including keyboard, pen and mouse functions, monitor circuitry 16c of monitor 28, speakers 16d–16e and microphone 16f to system unit 12. Together, the system unit 12, the serial bus elements 14, 18a–18b and 22a–22f, and the interconnected peripherals 16a–16f form an hierarchy of interconnected devices.

Under the present invention, a bus interface 22a–22f is always a termination point. Only a bus signal distributor, e.g. 18a, may have one or more bus signal distributors, e.g. 18b, and/or one or more bus interfaces, e.g. 16a, coupled upstream to it. For the purpose of this disclosure, upstream means "towards the bus controller". Thus, except for the degenerate case where the serial bus assembly 26 has only one connecting peripheral 16, typically it is a bus signal distributor, such as 18a, that is connected upstream to the bus controller 14.

Furthermore, under the present invention, a connecting peripheral may be an isochronous peripheral, such as telephone 16a, speakers 16d–16e, and microphone 16f, or asynchronous peripherals, such as compound keyboard 16b and monitor 16c. The isochronous peripherals may operate with a data transfer rate as high as 5 Mbps, while the asynchronous peripherals may operate with a data transfer rate as high as 100 kbps. Furthermore, a connecting peripheral 16a–16f may be a multiple function peripheral, i.e. multiple functions mapping to a single bus connection point serviced by a bus interface, e.g. 22b. Similarly, although not shown, the system unit 12 may support multiple clients.

Figure 3:
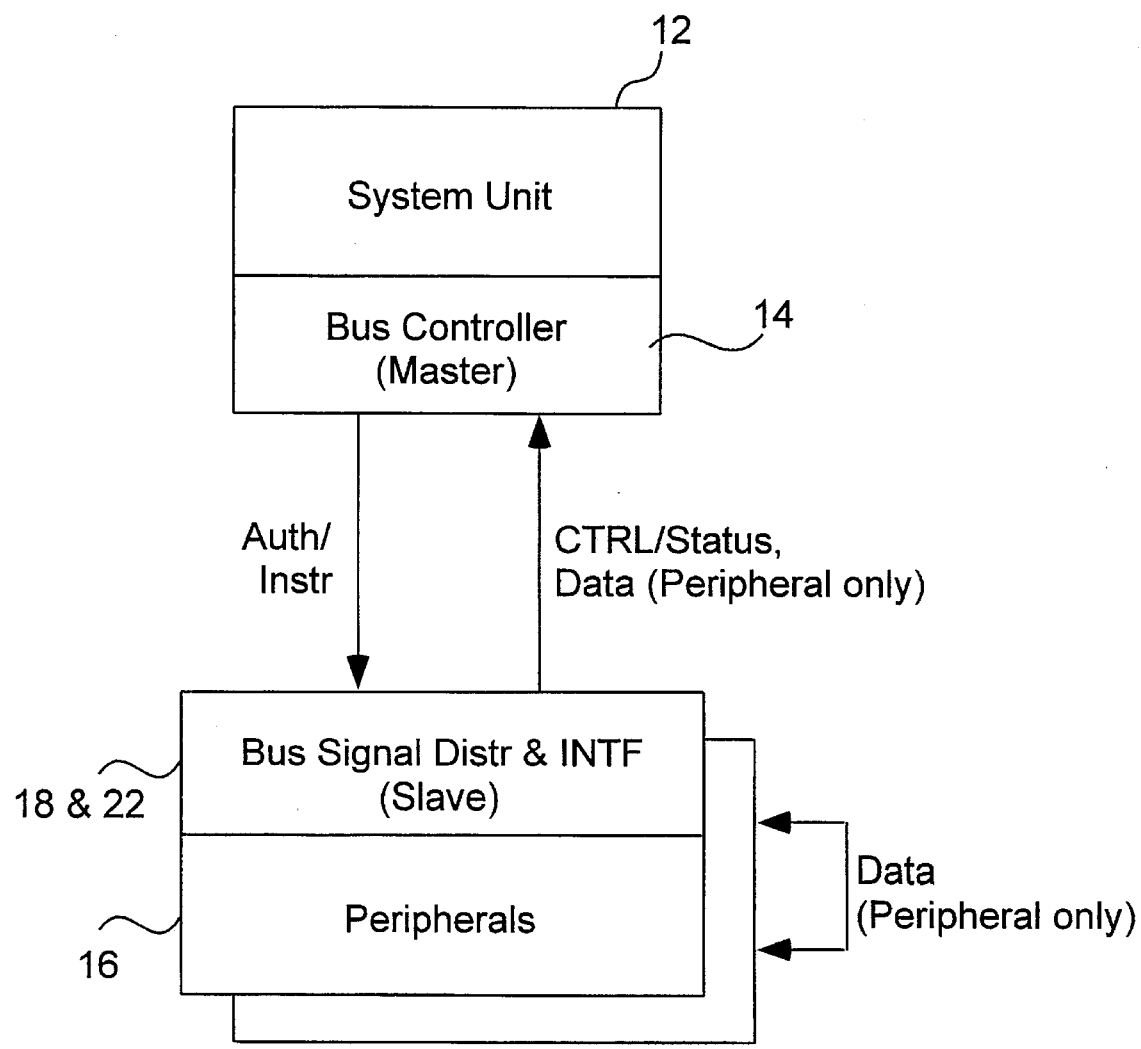
FIG. 3 illustrates a master/slave model of flow control employed by the present invention for serially interfacing the interconnected peripherals to the system unit and controlling transaction flows.

FIG. 3 illustrates a master/slave model of flow control employed by the present invention for serially interfacing the interconnected peripherals to the system unit and controlling transaction flow. As illustrated, the bus controller 14, the signal bus distributors 18, and the bus interfaces 22 cooperate to implement the master/slave model of flow control. The bus controller 14 serves as the master, and the signal bus distributors 18 as well as the bus interfaces 22 behave as slave devices to the bus controller 14.

Under the master/slave model, the bus controller 14 provides flow control for all data communication transactions between the bus agents at their respective operating speeds. The bus interfaces 22 engage in data communication transactions on behalf of the functions of the peripherals 16. However, the bus interfaces 22 accept or transmit data only if they have been authorized or instructed (aka "polled") to do so by the bus controller 14. The bus signal distributors 18 serve strictly as signal distributors. They are merely transparent conduits when data communication transactions are conducted by the bus controller 14 and the bus interfaces 22 on behalf of the bus agents. Thus, the bus signal distributors 18 never actively participate in data communication transactions, accept data or respond with data.

The bus controller 14 systematically polls the functions of the interconnected peripherals 16 through their bus interfaces 22 for data communication transactions in accordance to a polling schedule which guarantees latencies and bandwidths to the isochronous functions of the interconnected peripherals 16. Polling of the isochronous functions of the interconnected peripherals 16 for data communication transactions are prioritized over for all other polling and as frequent as they are necessary to meet the guaranty. Polling of the asynchronous functions of the interconnected peripherals 16 through their bus interfaces 22 for data communication transactions are scheduled around the polling of the isochronous functions of the interconnected peripherals 16 for data communication transactions. Preferably, the polling schedule is dynamically adapted to the interconnected peripherals 16 actually present.

In some embodiments, the bus controller 14, the bus signal distributors 18 and the bus interfaces 22 further engage in connection management transactions employing the same master/slave model for flow control. Similarly, the bus controller 14 provides flow control for conducting the connection management transactions at the serial bus elements' respective operating speeds. The bus signal distributors 18 and the bus interfaces 22 respond to the connection management transactions, replying with control/status information as appropriate. The bus controller 14, during operation, polls the bus signal distributors 18 and the bus interfaces 22 for such transactions. Polling of the bus signal distributors 18 and the bus interfaces 22 for connection management transactions are also scheduled around polling of the isochronous functions of the interconnected peripherals 16 for data communication transactions. Preferably, the expanded polling schedule is also dynamically adapted to the serial bus elements actually present.

Figure 4:
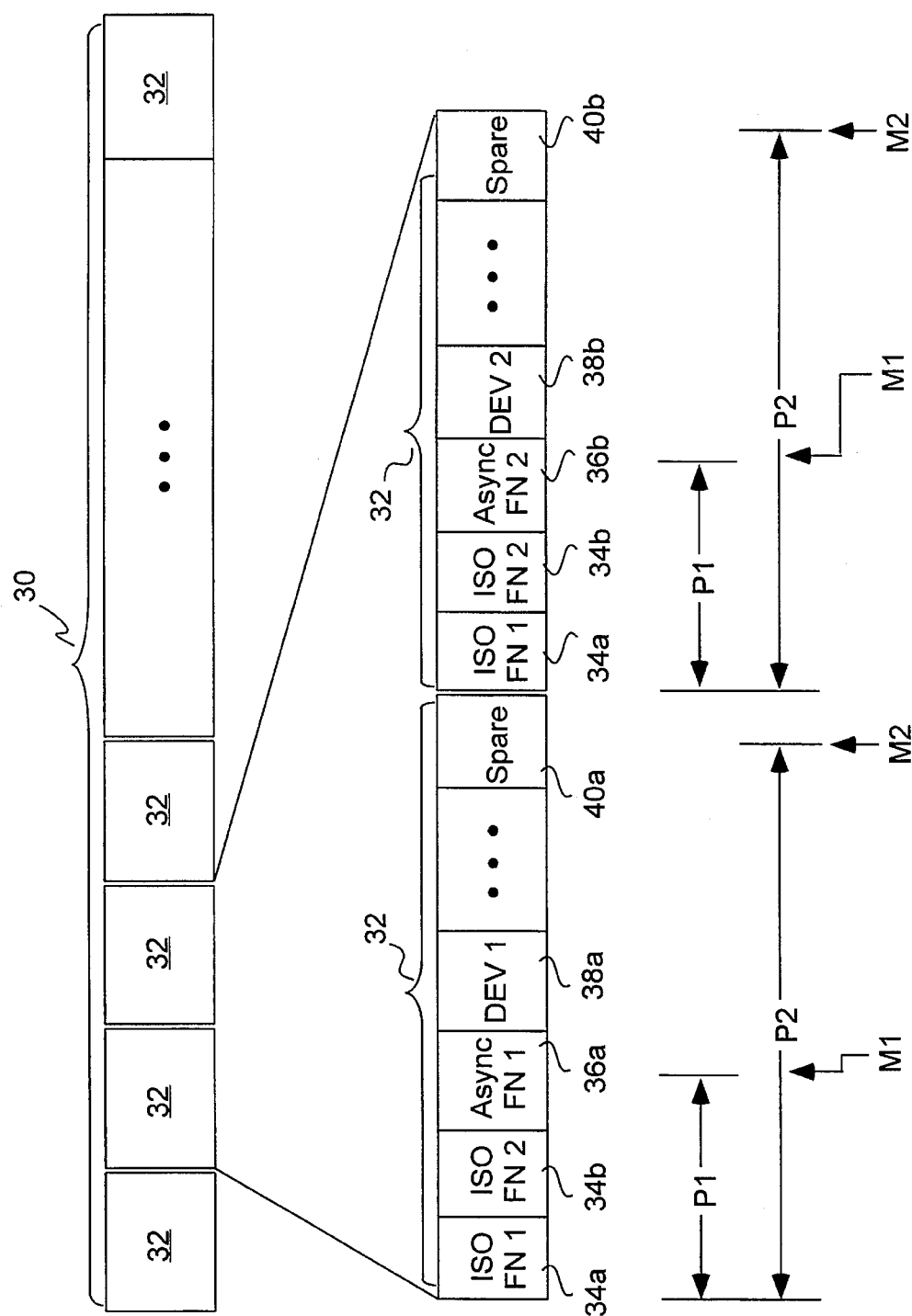
FIG. 4 illustrates a frame based polling schedule of the present invention implemented by some embodiments for polling the slave "devices"

FIG. 4 illustrate a frame based polling scheduling of the present invention implemented by some embodiments for conducting the various transactions employing the master/slave model of flow control. As illustrated, the polling schedule 30, also referred to a super frame, comprises of a number of sub-schedules 32, also referred to as soft frames. An isochronous function 34a or 34b of an interconnected peripheral 16 is polled as frequent as it is necessary in one or more soft frames 32 of the super frame 30 to guarantee its latency and bandwidth. However, an asynchronous function 36a or 36b is polled only once in one soft frame 32 of the super frame 30 for data communication transaction. Similarly, an interconnected device 38a or 38b is also polled only once in one soft frame 32 of the super frame 30 for connection management transaction.

Preferably, all isochronous functions 34a–34b are polled within a first percentage portion (P1) of a soft frame 32 to ensure the latency and bandwidth guarantees are met. Isochronous functions that cannot be accommodated within P1 are preferably rejected for insufficient capacity. The upper delimiter (M1) of P1 is also referred to as the isochronous watermark. Similarly, all polling are preferably performed within a second percentage portion (P2) of a soft frame 32 to ensure reliability of operation. Multiple soft frames 32 are employed if necessary to accommodate all asynchronous function and serial bus element polling. The upper delimiter (M2) of P2 is also referred to as the frame watermark.

Various manners in which such a frame based polling schedule may be dynamically generated and updated, are described in the contemporaneously filed copending application, Ser. No. 08/331,729, entitled Method And Apparatus For Dynamically Generating And Maintaining Frame Based Polling Schedules That Guaranty Latencies And Bandwidths To Isochronous Functions, which is hereby fully incorporated by reference.

Figure 5:
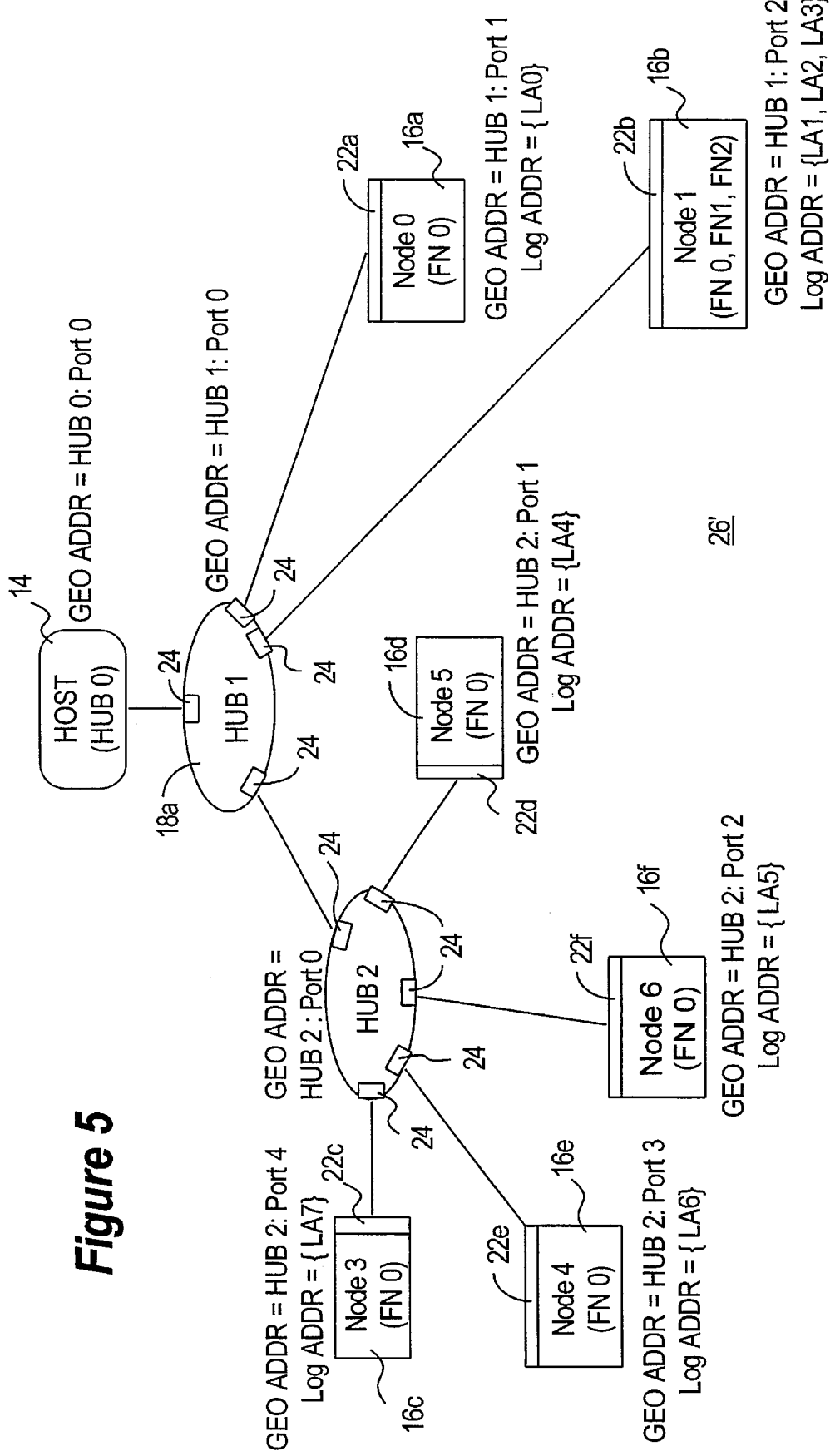
FIG. 5 illustrates geographical and logical addressing of the present invention implemented by some embodiments for addressing serial bus elements and functions of bus agents.

FIG. 5 illustrates geographical and logical addressing of the present invention implemented by some embodiments for addressing the serial bus elements and functions of bus agents. For ease of explanation, the same exemplary serial bus assembly of FIG. 2 is used. However, the bus controller 14 is labeled as Host, also referred to as Hub0. The bus signal distributors 18a–18b are labeled as Hub1 and Hub2. The peripherals 16a–16f including their corresponding bus interfaces 22a–22f are jointly labeled as Node0 through Node6. The functions of peripherals 16a–16f are labeled as FN0, FN1, etc.

As illustrated, the serial bus elements and functions of the bus agents are assigned geographical as well as logical addresses (GEO ADDR & LOG ADDR) of a geographical and a logical address space. More specifically, the Hubs 14, 18a–18b and the Nodes 22a–22f are assigned GEO ADDRes, whereas the functions of the Nodes 16a–16f are assigned LOG ADDRes. Preferably, the Hub identity as well as the upstream port of the Hub may be inferred from the GEO ADDR of a Hub 14, and 18a–18b, and the connecting Hub as well as the connecting port of the connecting Hub may be inferred from the GEO ADDR of a Node 22a–22f. In one embodiment, the LOG ADDRes are assigned to the functions of the Nodes 16a–16f in a chronological manner.

For examples, in the illustrated exemplary application, Hub1 and Hub2 18a and 18b are assigned the GEO ADDRes of "Hub1:Port0" and "Hub2:Port0" respectively, identifying the Hubs 18a and 18b as "Hub1" and "Hub2" respectively, and in each case, the upstream port being "Port0". Node1 and Node4 22b and 22e are assigned the GEO ADDRes of "Hub1:Port2" and "Hub2:Port3" respectively, identifying the connecting Hubs 18a and 18b as "Hub1" and "Hub2" respectively, and the connecting ports of connecting Hubs 18a and 18b as "Port2" and "Port3" respectively. The functions of Node1 16b are assigned the LOG ADDRes of "LA1", "LA2" and "LA3", whereas the function of Node4 16e is assigned the LOG ADDR of "LA6".

Preferably, the GEO ADDRes and the LOG ADDRes are dynamically assigned at power on or reset, and updated in response to live detachment of interconnected devices or attachment of additional devices, by the bus controller 14 in cooperation with the bus signal distributors 18 and the bus interfaces 22. A particular implementation of such dynamic connection management is described in more detail below.

For these embodiments, the GEO ADDRes are used to conduct connection management transactions among the serial bus elements, whereas the LOG ADDRes are used to conduct data communication transactions among the functions of the bus agents The separation of the two types of transactions into the two separate address spaces facilitate dynamic connection management of the serial bus elements, without having to interrupt services to the functions of the bus agents.

Figure 6:
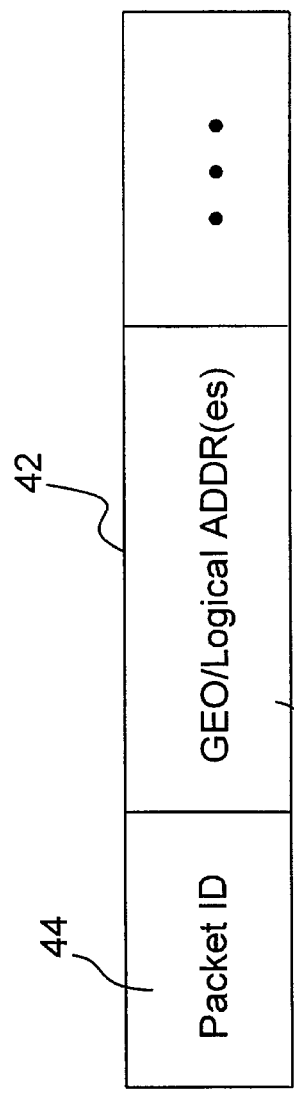
FIG. 6 illustrates the essential elements of communication packets of the present invention implemented by some embodiments for conducting transactions employing the master/slave model of flow control.

FIG. 6 illustrates the essential elements of communication packets of the present invention implemented by some embodiments for conducting the various transactions employing the master/slave model of flow control. For these embodiments, packet identifiers 44 are employed to differentiate control packets from data packets. Control packets are packets employed by the bus controller 14 to authorize or instruct the bus signal distributors 18 and the bus interfaces 22 to engage in transactions. Control packets may also include packets employed by the bus signal distributors 18 and the bus interfaces 22 to acknowledge authorizations or instructions from the bus controller 14. Furthermore, addresses 46 are employed as appropriate to identify the transaction parties. As will be appreciated that under the master/slave model of flow control, the bus controller 14 as a transaction participant may often be inferred, and therefore its address may be omitted.

Preferably, transaction flows, such as from bus controller 14 to a function, from a first function to a second function, may be inferred from the packet identifiers 44. Preferably, either geographical or logical addresses 46, i.e. "HubX-:PortY" or "LAz", may be specified to accommodate those embodiments that support connection management transactions and implement both types of addresses.

A particular implementation of employing such communication packets to conduct the various transactions is described in the contemporaneously filed copending application, Ser. No. 08/332,573, entitled Method And Apparatus For Exchanging Data, Status And Commands Over An Hierarchical Serial Bus Assembly Using Communication Packets, which is hereby fully incorporated by reference.

Figure 8:
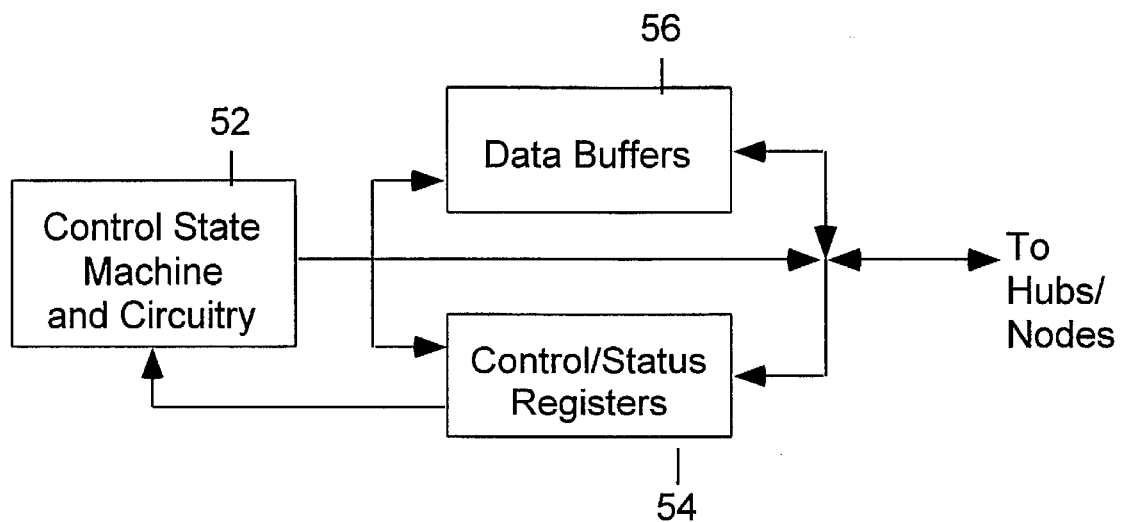
FIGS. 8–9 illustrate one embodiment of the bus controller of the present invention including its associated software.
Figure 9:
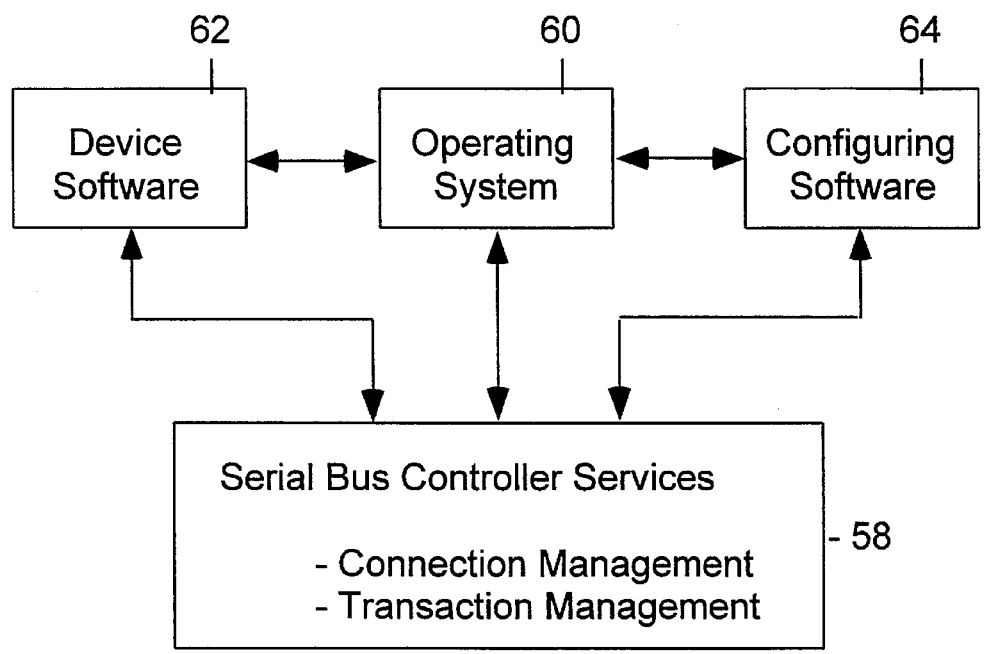

FIGS. 8–9 illustrate one embodiment of the bus controller of the present invention. In this embodiment, the bus controller 14 includes a control state machine and circuitry 52, control/status registers 54, data buffers 56, and bus controller software services 58. The control/status registers 54 are used to store the various control and status data. For examples, the serial bus elements present, their interconnection topology, the functions of the various interconnected peripherals, the geographical addresses assigned to the serial bus elements, the logical addresses assigned to the functions of the interconnected peripherals. The data buffers 56 are used to buffer the data of the data communication transactions between the bus agents. The control state machine and circuitry 52 operates the hardware, controlling data communication transactions and employing the above described master/slave model of flow control, under the programming of the bus controller software services 58. For some embodiments, the control state machine and circuitry 52 further operates the hardware, controlling connection management transactions, implementing the master/slave model of flow control with frame based polling schedule, employing geographical and logical addressing, supporting communication packet based transactions, and/or inference of data and control states from states of the propagation electrical signals. In particular, the control and state machine circuitry 52 causes the bus controller 14 to cooperate with the bus signal distributors 18 and the bus interfaces 22, and perform the dynamic connection management steps of the present invention, which will be described in more below.

The bus controller software services 58 program the control state machine and circuitry 52 responsive to the operating system 60 and other software such as device and configuring software 62 and 64 of the system unit 12. In particular, the services include connection management such as detection of serial bus elements present, detection of their interconnection topology, detection of the functions of the interconnected peripherals, and assignment of the geographical and logical addresses. The services further include transaction management such as generation and maintenance of the polling schedule, polling of the serial bus elements and functions of the bus agents, acknowledgment of certain responses of the serial bus elements and functions of the bus agents, and exchange of data with functions of the bus agents.

For a more detailed description of the bus controller hardware and the bus controller software services 58, refer to the incorporated by reference copending applications, Ser. Nos. 08/331,727, 08/332,573, and 08/332,339. It should be noted that the allocation of functions to the hardware and software services of the bus controller 14 is implementation dependent. The present invention may be practiced with any number of allocations, ranging from minimal hardware usage to minimal employment of software services.

Figure 10:
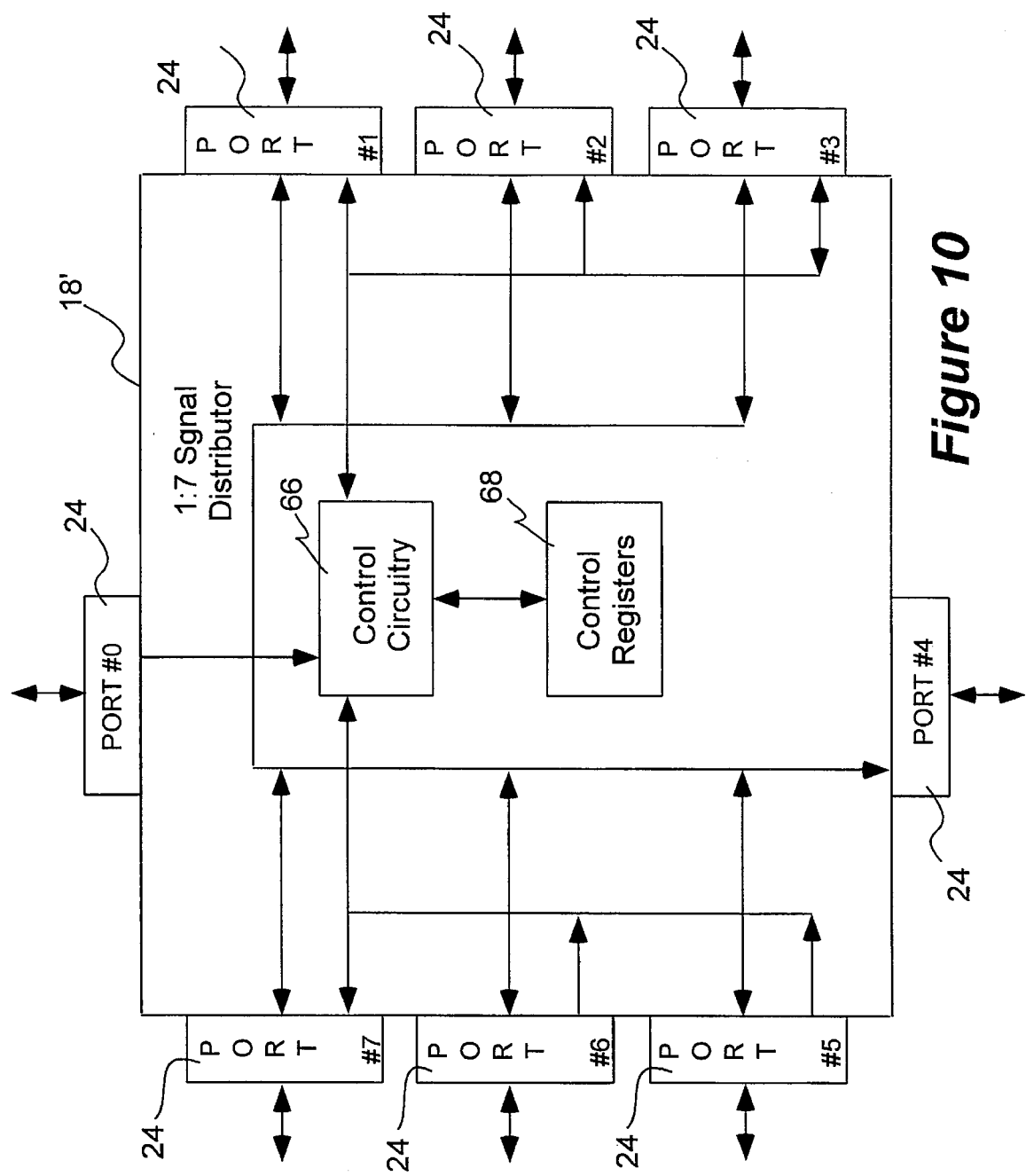
FIGS. 10–11 illustrate one embodiment of the 1:n bus signal distributor of the present invention including its port circuitry.
Figure 11:
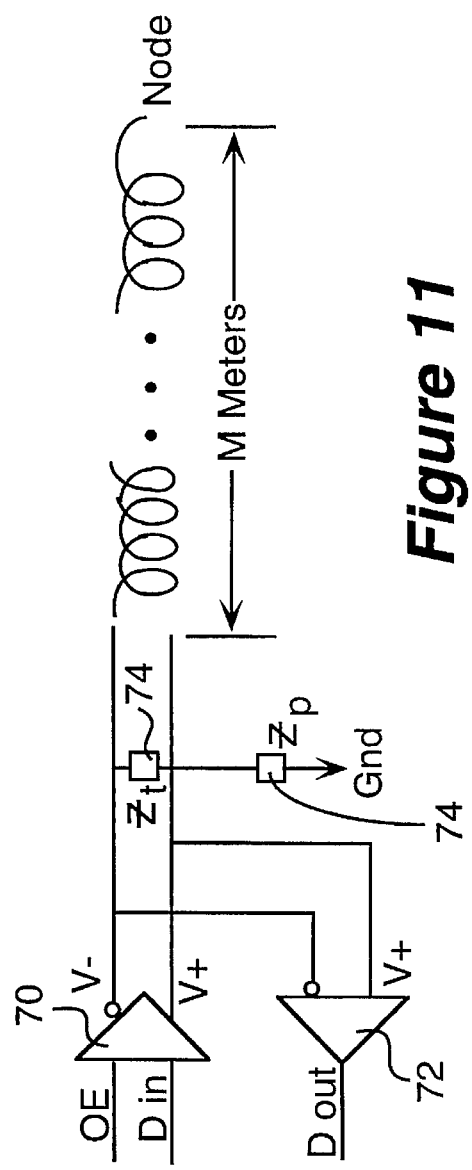

FIGS. 10–11 illustrate one embodiment of the bus signal distributor of the present invention. The illustrated embodiment is a 1:7 bus signal distributor 18' having control circuitry 66, control registers 68, and 8 ports Port 0 24 is used to connect the bus signal distributor 18' upstream to the bus controller 14 or another bus signal distributor 18. Ports 1–7 are used to connect up to a total of 7 bus signal distributors 18 and/or bus interfaces 22 to itself. The control registers 68 are used to store its own control and status information such as whether a port 24 has a bus interface 22 connected to it or not, and whether the port 24 is turned ON/OFF. The control circuitry 66 operates the bus signal distributor 18' responsive to instructions from the bus controller 14. In particular, the control circuitry 66 causes the bus signal distributor 18 to cooperate with the bus controller 14, and perform the dynamic connection management steps of the present invention, which will be described in more detail below.

In embodiments where the low cost two signal wire cables 20 are used to interconnect the serial bus elements, and electrical signals are preferably propagated in a differential manner, each port 24 comprises two differential amplifiers 70 and 72 for generating the differential signals. Preferably, each port 24 further having two resistors 74 coupled to ground as shown, pulling the signals on the two wires to ground, thereby allowing the absence or presence of a connected bus interface 22 to be discernible. The appropriate values of resistors 74 may be determined empirically depending on individual implementations.

Figure 13:
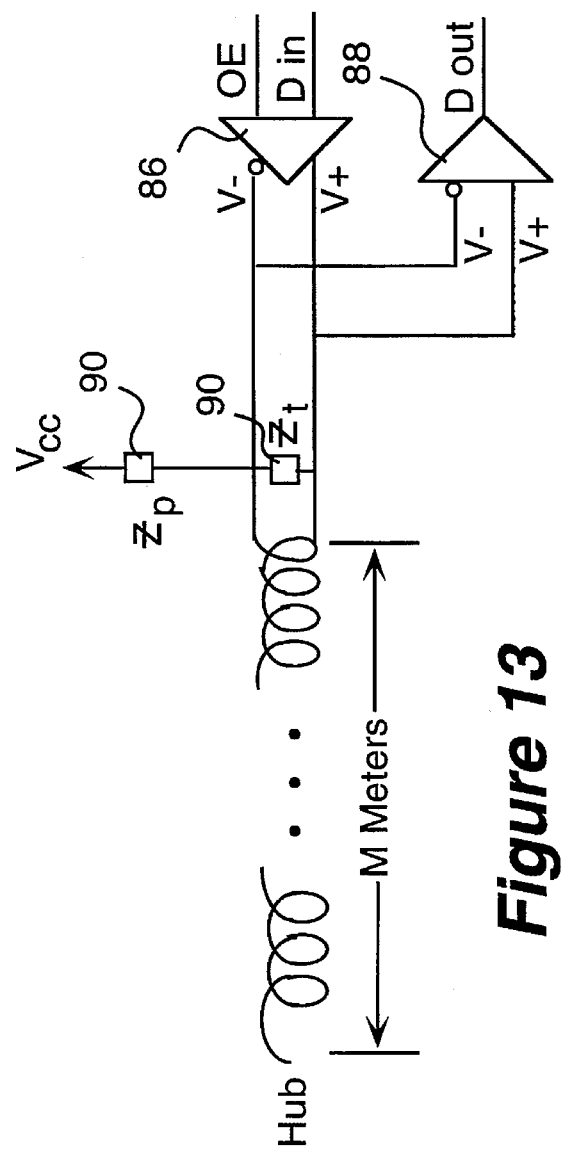
FIGS. 12–13 illustrate one embodiment of the bus interface of the present invention including its connector circuitry.
Figure 12:
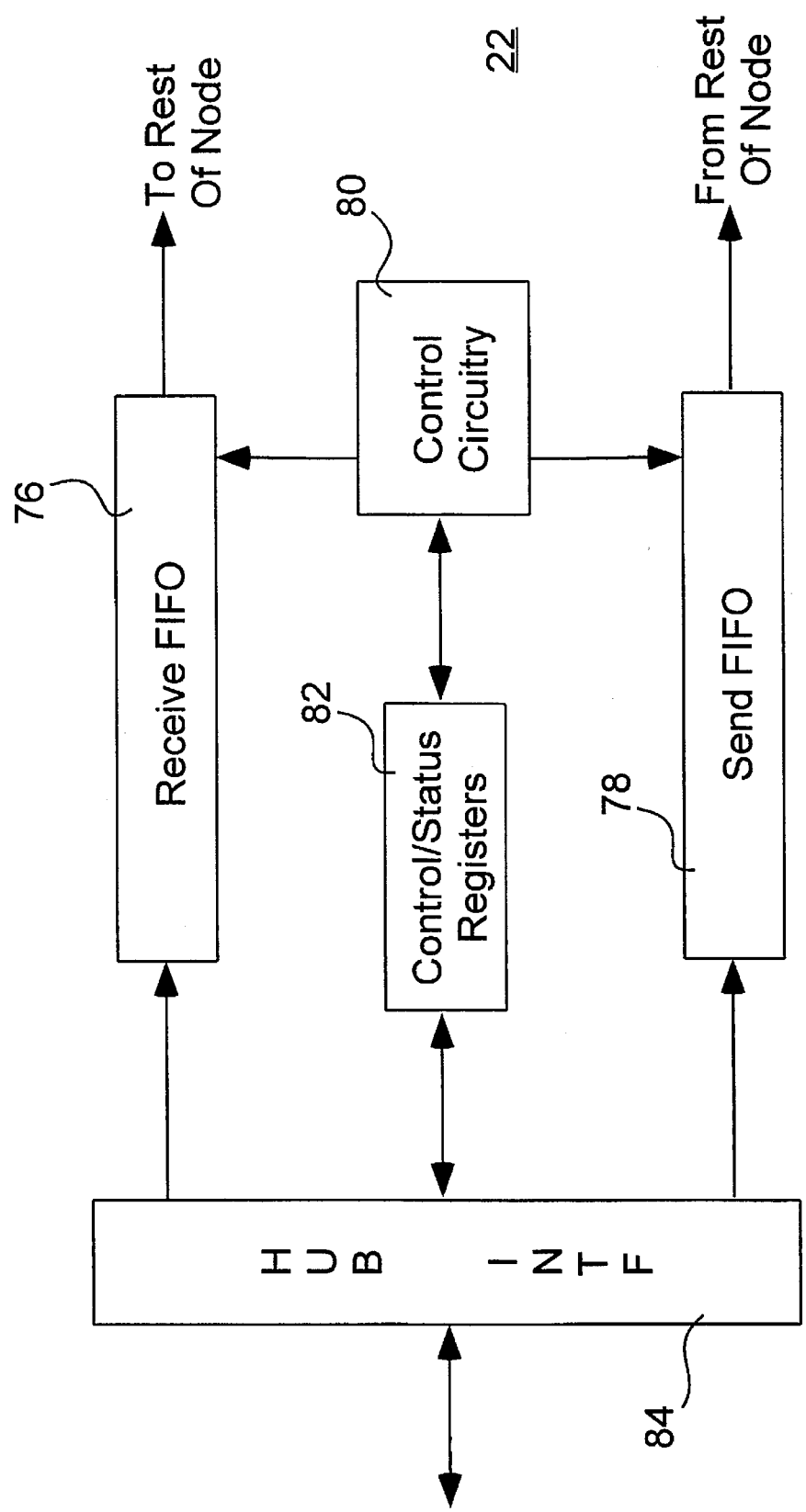

FIGS. 12–13 illustrate one embodiment of the bus interfaces of the present invention. For this embodiment, the bus interface 22 comprises control circuitry 80, control/status registers 82, a Connector interface 84 and two FIFOs 76–78, a Receive FIFO 76 and a Send FIFO 78. Receive and Send FIFOs 76–78 are used to stage the receive and send data for data communication transactions. The control/status registers 68 are used to store its own control and status information such as its assigned geographical address, functions of its "host" peripheral, and their assigned logical addresses. The control circuitry 66 operates the bus interface 22 on behalf of the "host" peripheral and the "host" peripheral's functions, responsive to authorizations and instructions from the bus controller 14. In particular, control circuitry 66 causes the bus interface 22 to cooperate with the bus controller 14, and perform the dynamic connection management steps of the present invention, which will be described in more detail below.

In embodiments where the low cost two signal wire cables 20 are used to interconnect the serial bus elements, and electrical signals are preferably propagated in a differential manner, the Connector interface 84 comprises two differential amplifiers 86 and 88 for generating the differential signals. Preferably, the Connector interface 84 further includes two resistors 90 coupled to Vcc as shown, pulling the signals on the two wires to Vcc complementary to the port circuitry of a connecting bus signal distributor 18. The appropriate values of resistors 90 may also be determined empirically depending on individual implementations.

For a more detailed description of the bus interface 22, refer to the incorporated by reference copending applications, Ser. Nos. 08/331,727, 08/332,573 and 08/332,337.

Dynamic Connection Management

Having now described the hierarchical serial bus assembly 26 and the manner its elements cooperate to serially interface the isochronous and asynchronous peripherals 16 to the system unit 12 of the exemplary computer system 10, the dynamic connection determination and management steps of the present invention performed by the serial bus elements of such hierarchical serial bus assembly will now be described in detail.

Figure 14:
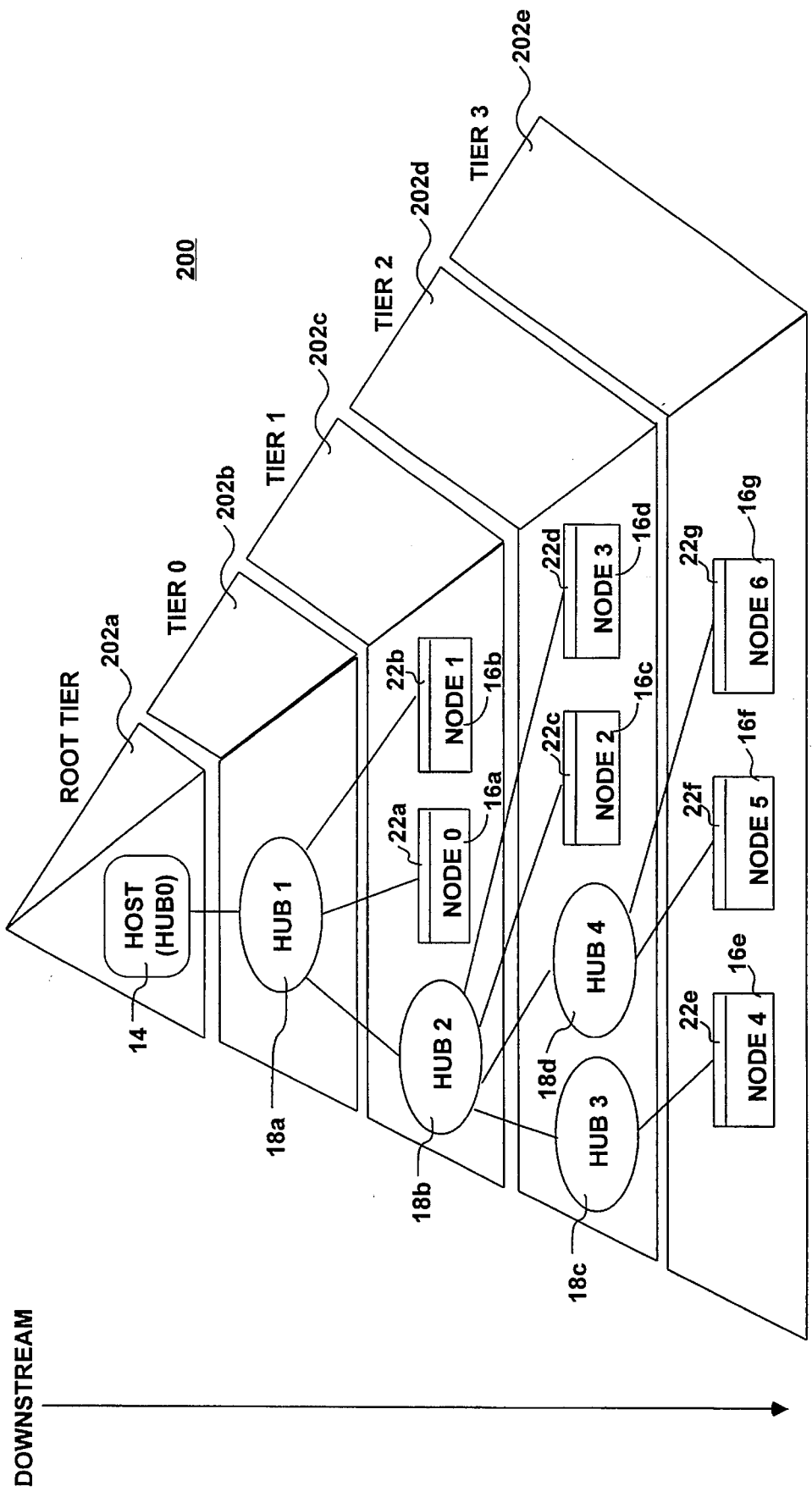
FIG. 14 illustrates an hierarchical view of the serial bus elements of the present invention employed by the bus controller for determining and managing connection topology.

FIG. 14 illustrates an hierarchical view of the serial bus elements of the present invention employed by the bus controller 14 for determining and managing connection topology. As illustrated, the hierarchy 200 of serial bus elements is logically divided into tiers 202a–202e. The bus controller 14 and the system unit 12, labeled as Host or Hub0, is considered logically occupying a root tier. The first bus signal distributor 18d connected to the bus controller 14, labeled as Hub1, is considered logically occupying a tier zero. The second bus signal distributor 18e, the first and second bus interface 22g–22h and their "host" peripherals 16g–16h connected to the first bus signal distributor 18d, labeled as Hub2, Node0 and Node1 respectively, are considered logically occupying a tier one. The third and fourth bus signal distributors 18f–18g, the third and fourth bus interface 22i–22j and their "host" peripherals 16i16j connected to the second bus signal distributor 18e, labeled as Hub3, Hub4, Node2 and Node3 respectively, are considered logically occupying a tier two. Lastly, the fifth, sixth and seventh bus interface 22k–22m and their "host" peripherals 16k–16m connected to the third and fourth bus signal distributors 18f–18g, labeled as Node4, Node5 and Node6 respectively, are considered logically occupying a tier three.

While the hierarchical view of serial bus elements is being illustrated with five logical tiers, it will be appreciated that the number of logical tiers is limited only by the physical characteristics of the serial bus elements. In one embodiment, the hierarchical serial bus assembly 16 consists as many as seven logical tiers. It will be appreciated that the present invention may be practiced with less or more logical tiers.

Figure 15A:
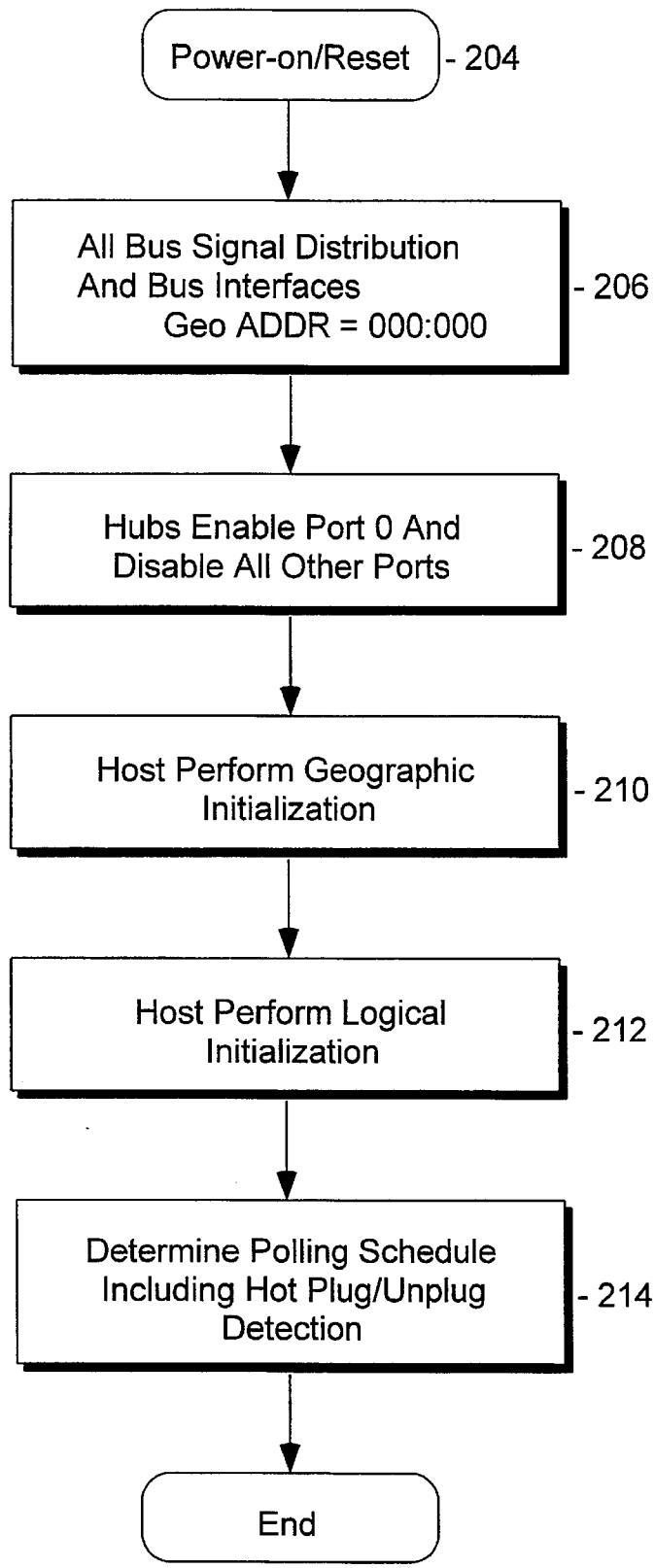
FIGS. 15a–15c illustrate the collective method steps of the present invention performed by the serial bus elements for determining and managing connection topology at power on or reset, employing the hierarchical view of serial bus elements.
Figure 15B:
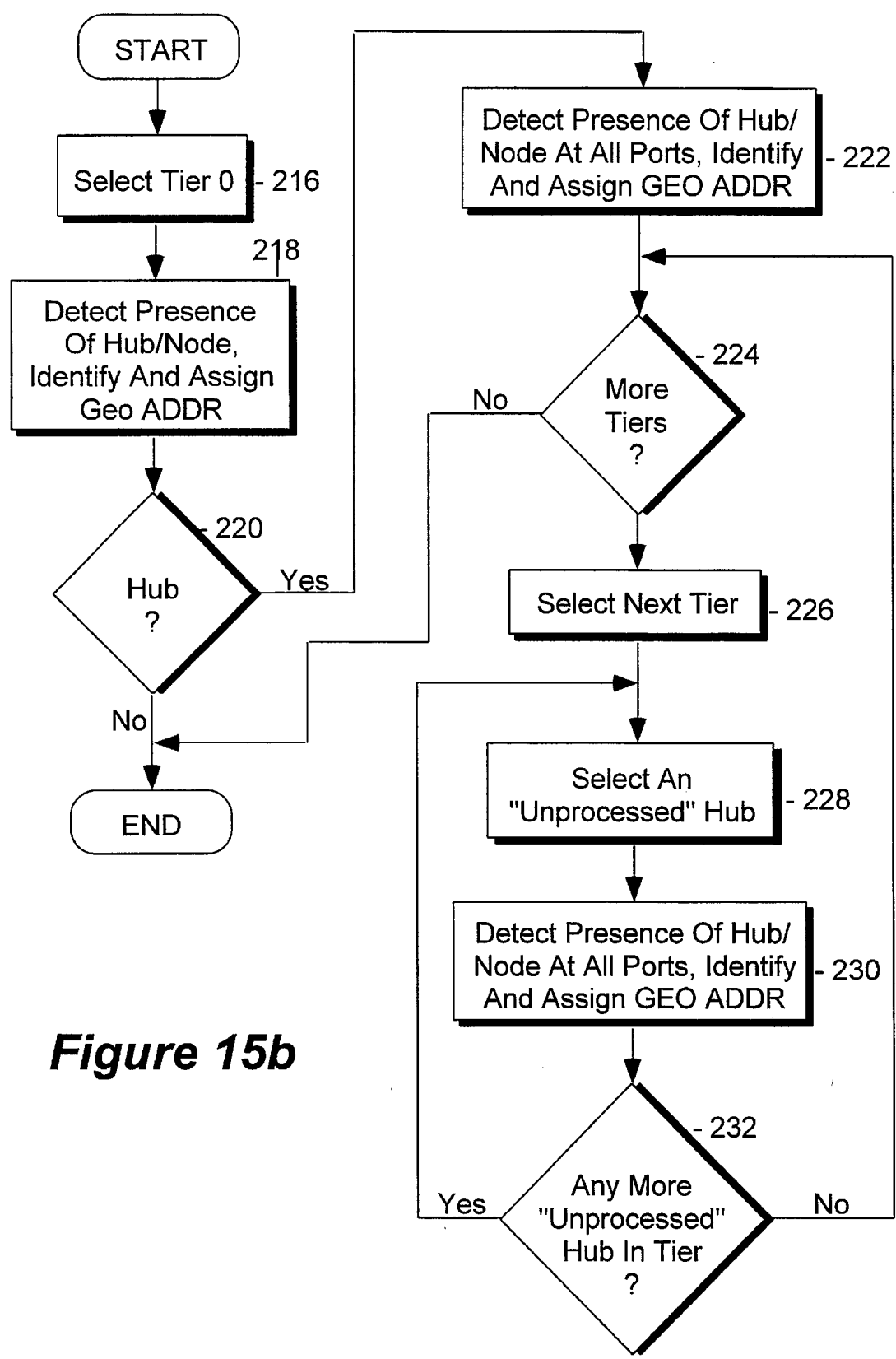
Figure 15C:
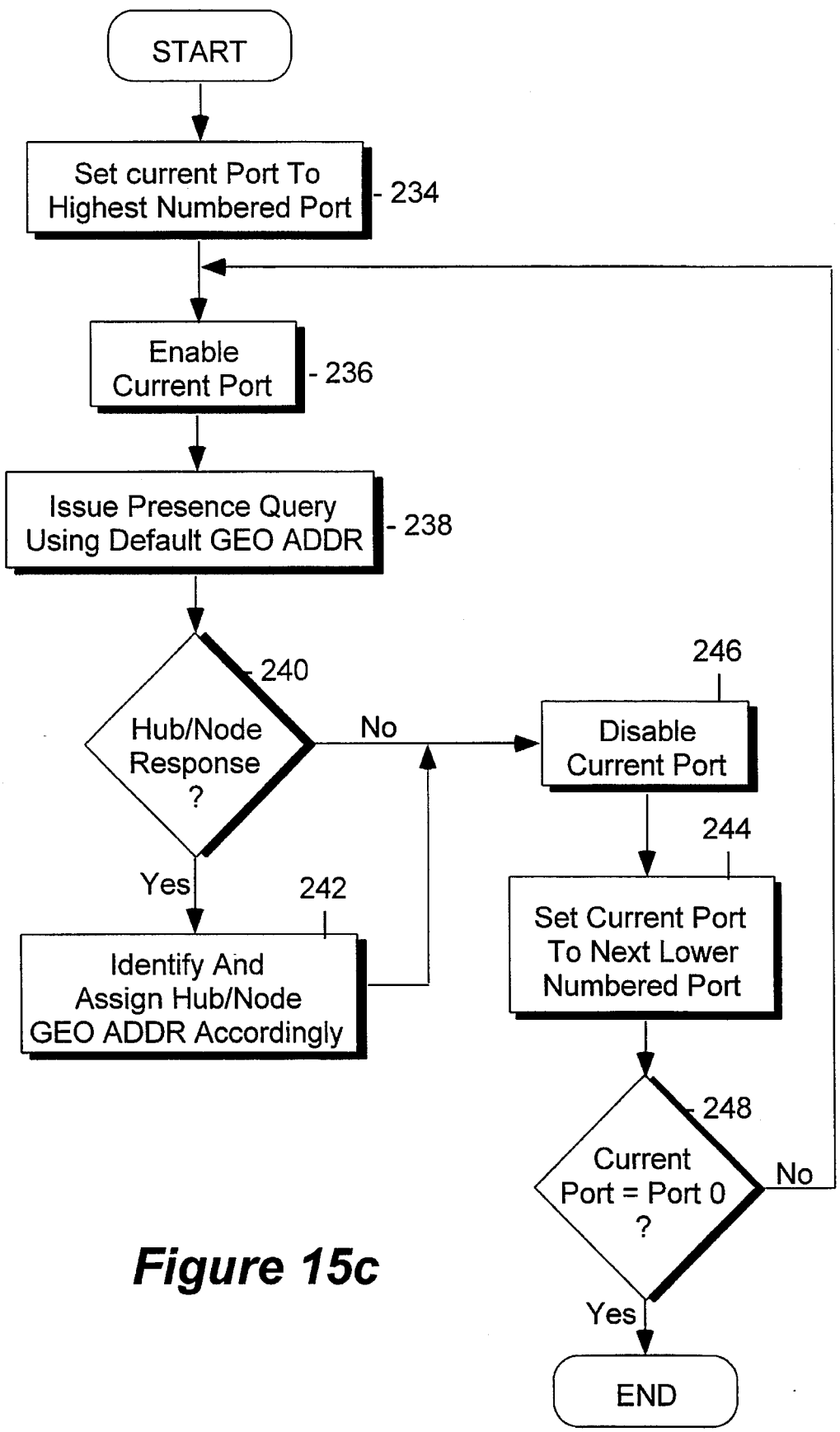

FIGS. 15a–15c illustrate the collective method steps of the present invention performed by the serial bus elements for determining and managing connection topology at power on or reset, employing the hierarchical view of the serial bus elements. As illustrated in FIG. 15a, at power on or reset, event 204, all bus signal distributors 18 and all bus interfaces 22 initialize themselves with a predetermined default initialization GEO ADDR, e.g. "000:000" for "Hub0" and "Port0", step 206. Furthermore, all bus signal distributors 18 enable their upstream connection port, e.g. port 0, and disable all other ports, step 208. Next, the bus controller 14 in cooperation with the bus signal distributors 18 and the bus interfaces 22 perform geographic initialization of the serial bus assembly 26, step 210.

FIG. 15b illustrates the method steps of the present invention performed by the bus controller 14 for geographically initializing the serial bus assembly 26. Initially, the bus controller 14 selects logical tier zero, step 216. The bus controller 14 then detects if any serial bus element is connected to itself, step 218. If a serial bus element is connected, the bus controller 14 causes the serial bus element to identify itself, i.e. whether it is a bus signal distributor 18 or a bus interface 22, step 218. When instructed to do so, the connected bus signal distributor 18 or bus interface 22 responds accordingly, step 218. The bus controller 14 then assigns a GEO ADDR to the connected serial bus element, step 218.

In embodiments where the bus controller 14 supports communication packet based transactions, the bus controller 14 sends out a "Presence Query" transaction using the predetermined default initialization GEO ADDR. Recall that all serial bus elements initialize themselves as if they have been assigned the default initialization GEO ADDR, and furthermore all bus signal distributors 18 enable only their upstream port 24, and disable all other ports, thus only the first serial bus element directly connected to the bus controller 14 will "hear" the "Presence Query" transaction sent out by the bus controller 14. Therefore, only the first serial bus element will respond, allowing the bus controller 14 to discern whether a serial bus element is connected to itself.

The bus controller 14 in turn sends out an "Identification" transaction still using the predetermined default initialization GEO ADDR, requesting the first serial bus element to identify whether it is a bus signal distributor 18 or a bus interface 22. For the same reason, the first serial bus element will be the only serial bus element detecting that it is the addressee of the "Identify" transaction, and responds with the identification information accordingly. The bus controller 14 then sends out a "GEO ADDR Assignment" transaction still using the predetermined default initialization GEO ADDR, assigning a new GEO ADDR to the first serial bus element, e.g. "001:000" for "Hub1" and "Port0". The first serial bus element, still being the only serial bus element "hearing" the transaction, updates its GEO ADDR accordingly. Preferably, the first serial bus element will acknowledge the address assignment.

If the first serial bus element identifies itself as a bus interface 22, step 220, we have the degenerated case of a single connected peripheral. Geographical initialization is completed then. On the other hand, if the first serial bus element identifies itself as a bus signal distributor 18, step 220, the bus controller 14 proceeds to detect whether any serial bus elements are connected to the ports of the first bus signal distributor 18, step 222.

FIG. 15c illustrates the method steps of the present invention performed by the bus controller 14 for detecting the presence of connected bus signal distributors 18 and/or bus interfaces 22 at the various ports of a bus signal distributor 18. For ease of explanation, these method steps are illustrated with embodiments where the bus signal distributor ports 24 are "numbered". Furthermore, the upstream port is the lowest numbered port, i.e. port zero, and the highest numbered port is predetermined. However, based on the description to follow, it will be appreciated that the present invention may be practiced with other manner of port identification, as long as the port identification information are provided to the bus controller 14 as part of the earlier described identification process.

The bus controller 14 sets a current port pointer to the highest numbered port of the bus signal distributor of interest, step 234. The bus controller 14 then instructs the bus signal distributor of interest to enable the current port, i.e. the highest numbered port at this time, step 236. The bus controller 14 then detects if any serial bus element is connected to the particular port of the bus signal distributor of interest, step 238. If a serial bus element is not connected, the bus controller 14 disables the particular port of the bus signal distributor of interest, step 244. If a serial bus element is connected, the bus controller 14 causes the connected serial bus element to identify itself, and assigns a GEO ADDR to the connected serial bus element accordingly, step 242, before disabling the particular port of the bus signal distributor of interest, step 244.

Again, in embodiments where the bus controller 14 supports communication packet based transactions, at step 238, the bus controller 14 sends out a "Presence Query" transaction using the predetermined default initialization GEO ADDR. For the same reason discussed earlier, only the serial bus element connected to the particular port of the bus signal distributor of interest will "hear" the "Presence Query" transaction sent out by the bus controller 14. Therefore, only this serial bus element will respond, allowing the bus controller 14 to discern whether a serial bus element is connected to the particular port of the bus signal distributor of interest.

The bus controller 14 then follows with an "Identification" transaction, and a "GEO ADDR Assignment" transaction, using the predetermined default initialization GEO ADDR, as described earlier, thereby causing the newly detected serial bus element to be identified and assigned with a new GEO ADDR. Preferably, a bus interface 22 will also respond with the functions of its "host" peripheral as an integral part of its reply to the "Identify" transaction. Alternatively, a separate function identification transaction may be performed.

Continuing now with FIG. 15c, upon disabling the particular port of the bus signal distributor of interest, the bus controller 14 sets the current port pointer to the next lower numbered port, step 246. If the updated current port pointer is not pointing to the upstream port, step 248, the bus controller 14 enables the particular port of the bus signal distributor of interest, and performs the detection, identification, and GEO ADDR assignment as described earlier. If the updated current port pointer is pointing to the upstream port, step 248, geographical initialization is completed.

Returning back to FIG. 15a, upon completing geographic initialization, step 210, the bus controller 14 in cooperation with the bus interfaces 22 performs logical initialization, step 212. More specifically, if "host" peripheral function identification has not been performed as an integral part of the geographical initialization process, the bus controller 14 systematically polls the bus interfaces 22 for the information. Upon learning all the functions of the "host" peripherals, the bus controller 14 assigns LOG ADDRes to the identified functions, step 212. In some embodiments, the logical addresses are assigned chronologically, e.g. LA0 for FN0, LA1 for FN1, etc. etc.

Lastly, for embodiments where the bus controller 14 dynamically generates and updates its polling schedule, the bus controller 14 generates its polling schedule of the serial bus elements including systematic polling to detect attachment or detachment of serial bus elements, step 214. The detection of attachment or detachment of serial bus elements is performed with connection management transactions in like manner as detection for presence of connected serial bus elements at the various ports 24 of a bus signal distributor 18 performed during geographical initialization. As described earlier, polling of serial bus elements for connection management transactions are scheduled around the polling of isochronous functions for data communication transactions. Preferably, the information necessary to generate and maintain the polling schedule dynamically is collected as part of the identification process, post geographical initialization, or also an integral part of geographical initialization.

Figure 16:
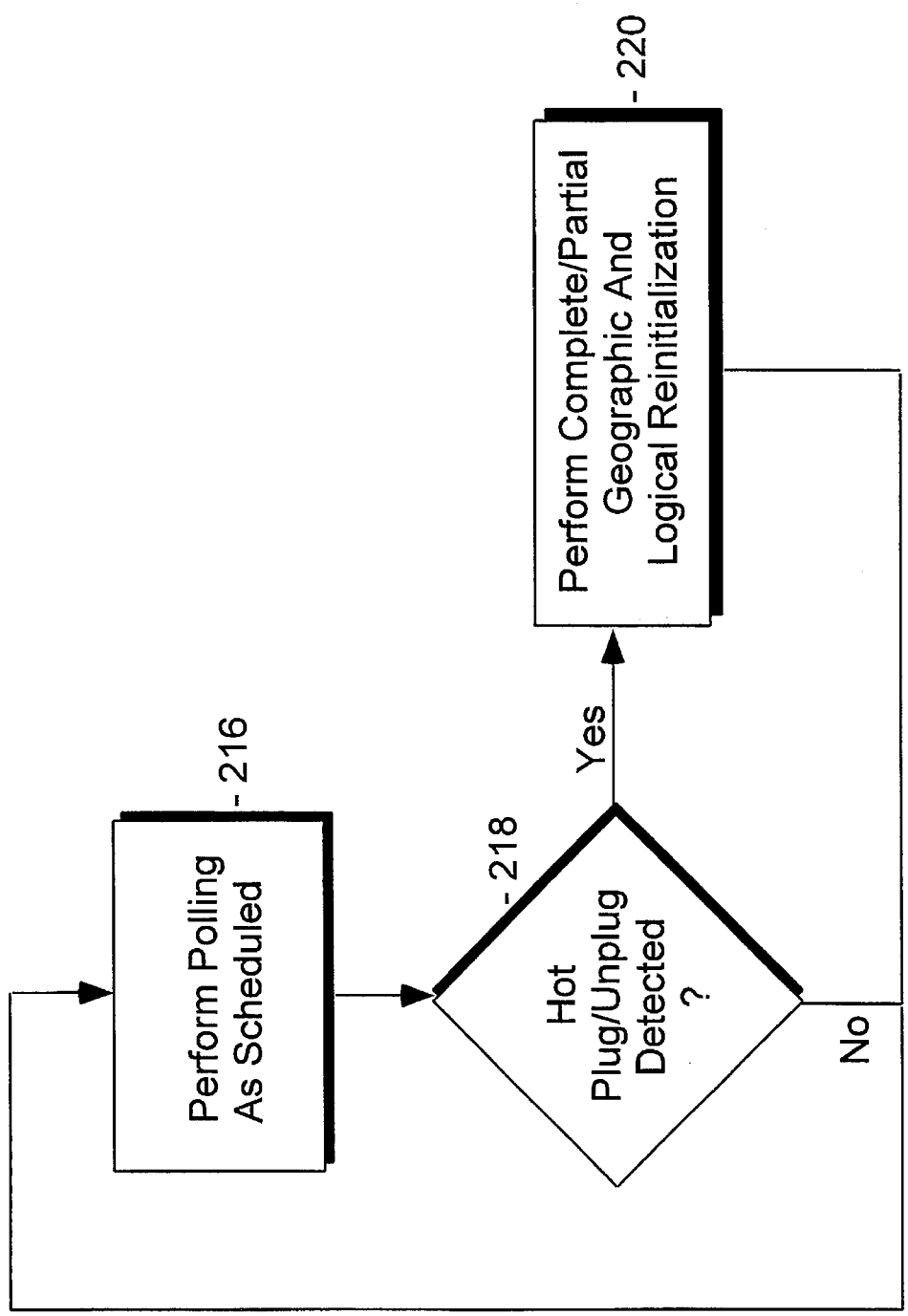
FIG. 16 illustrates the collective method steps of the present invention performed by the serial bus elements for managing connection topology during operation.

FIG. 16 illustrates the collective method steps of the present invention performed by the serial bus elements for managing connection topology during operation. As illustrated, upon successful completion of connection topology determination and management activities at power on or set, the bus controller 14 proceeds to poll the serial bus elements and bus agent functions in accordance to the polling schedule, step 216. As described earlier, the polling schedule includes polling for connection management transactions that facilitate the detection of detachment of connected serial bus elements, or attachment of additional serial bus elements. If attachment or detachment of serial bus elements is detected, step 218, the bus controller 14 performs complete/partial geographical and logical reinitializations in like manner as geographical and logical initialization is performed during power on or reset. Preferably partial reinitializations are always performed as long as a function of an interconnected peripheral 16 still requires interaction with the system unit 12. Recall that polling for connection transaction management is scheduled around polling of the isochronous as well as asynchronous functions of the interconnect peripherals 16 for data communication transactions, thus partial reinitialization may be performed without having to interrupt servicing of the isochronous and asynchronous functions of the interconnected peripherals 16.

Thus, a method and apparatus for dynamically managing connection topology of an hierarchical serial bus assembly has been described.

While the present invention has been described in terms of the above embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

We claim:

1. An apparatus for dynamically determining and managing connection topology of a serial bus assembly including a bus controller, one or more bus signal distributors, and one or more bus interfaces for hierarchically interconnecting one or more peripherals to a system unit of a computer system, each bus interface being coupled to a bus signal distributor, which in turn is coupled to another bus signal distributor, except for one bus signal distributor, which is coupled to the bus controller, said apparatus comprising:

first circuitry for initializing each bus signal distributor and each bus interface with a predetermined default common geographical address at power on/reset, and for subsequently replacing the common geographical address with a unique geographical address assigned by the bus controller that is reflective of the one or more bus signal distributors and the one or more bus interfaces' topological positions in the serial bus assembly;

second circuitry for enabling an upstream port and disabling all other ports of each bus signal distributor at power on/reset, and for selectively enabling the disabled ports as instructed by the bus controller; and third circuitry and complementary logic, coupled to the first and second circuitry, for facilitating the bus controller to employ a logical hierarchical view of the serial bus assembly to selectively instructing the disabled ports of the bus signal distributors to be enabled, one disabled port at a time, to incrementally detect the presence of each bus signal distributor/bus interface, and assign a unique geographical address to each detected bus signal distributor/bus interface, in a systematic manner, at power on/reset and periodically during operation.

2. The apparatus as set forth in claim 1, wherein said first circuitry comprises a plurality of initialization circuitry correspondingly disposed on said one or more bus signal distributors and said one or more bus interfaces, one initialization circuitry for each bus signal distributor/bus interface, for initializing each of said one or more bus signal distributors and one or more bus interfaces to the predetermined default common geographical address at power on/reset, and for subsequently replacing the common geographical address with the assigned unique geographical address.

3. The apparatus as set forth in claim 1, wherein said second circuitry comprises a plurality of port enabling/disabling circuitry correspondingly disposed on said one or more bus signal distributors, one port enabling/disabling circuitry for each bus signal distributor, for selectively enabling and disabling ports of each of said one or more bus signal distributors, including enabling the upstream port and disabling all other ports of each of said one or more bus signal distributors at power on/reset as well as enabling/disabling a disabled/enabled port as instructed by the bus controller.

4. The apparatus as set forth in claim 3, wherein, said third circuitry and complementary logic comprises first control circuitry and complementary logic disposed on said bus controller for assigning a unique geographical address to a bus interface, whenever the bus interface is detected, said first control circuitry and complementary logic further determining how many functions are supported by a peripheral hosting the bus interface, and assigning a unique logical address to each of the functions, upon assigning a unique geographical address to the bus interface.

5. The apparatus as set forth in claim 4, wherein, said third circuitry and complementary logic further comprises second control circuitry and complementary logic disposed on said bus controller for systematically instructing the disabled ports of a bus signal distributor to be enabled, one port at a time, detecting if a bus interface is connected to a port once the port is enabled, and instructing the port to be disabled again if no bus interface is detected, whenever the bus signal distributor is detected.

6. In a computer system comprising a serial bus assembly, including a bus controller, one or more bus signal distributors, and one or more bus interfaces, for hierarchically interconnecting one or more peripherals to a system unit of the computer system, each bus interface being coupled upstream to a bus signal distributor, which in turn is coupled upstream to another bus signal distributor, with the exception of one bus signal distributor, which is coupled upstream to the bus controller, a method for dynamically determining and managing connection topology of the serial bus assembly, the method comprising the steps of:

a) initializing each bus signal distributor and each bus interface with a predetermined default common geographical address at power on/reset;

b) enabling an upstream port and disabling all other ports of each bus signal distributor at power on/reset; and c) selectively instructing the disabled ports to be enabled, one at a time, to incrementally detecting the presence of each bus signal distributor/bus interface, employing a logical hierarchical view of the serial bus assembly, and assigning a unique geographical address to each detected bus signal distributor/bus interface to replace the predetermined default common geographical address, in a systematic manner, at power on/reset, and periodically during operation, by the bus controller, the unique geographical address being reflective of the one or more bus signal distributors and the one or more bus interface's topological positions in the serial bus assembly.

7. The method as set forth in claim 6, wherein step (a) comprises self-initializing each of said one or more bus signal distributors and one or more bus interfaces to the predetermined default common geographical address at power on/reset.

8. The method as set forth in claim 7, wherein, step (c) further comprises assigning by the bus controller a unique geographical address to a bus interface upon detecting the bus interface, and determining by the bus controller how many functions are supported by a peripheral hosting the detected bus interface, and assigning by the bus controller a logical address to each of the functions, upon assigning a unique geographical address to the bus interface.

9. The method as set forth in claim 8, wherein, step (c) comprises systematically instructing the disabled ports of a bus signal distributor to be enable, by the bus controller, one port at a time, detecting if a bus interface is connected to a port by the bus controller once the port is enabled, and instructing the port to be disabled again by the bus controller if no bus interface is detected.

10. A computer system bus controller for interconnecting one or more peripherals to a system unit through one or more bus interfaces and one or more bus signals distributors, each bus interface being coupled upstream to a bus signal distributor, which in turn is coupled upstream to another bus signal distributor, with the exception of one bus signal distributor, which is coupled upstream to the bus controller, the bus controller comprising circuitry and complementary logic for selectively instructing disabled ports of the bus signal distributors to be enabled, one at a time, to incrementally detect the presence of the one or more bus signal distributors, and the presence of the one or more bus interfaces, and assigning a unique geographical address to each detected bus signal distributor/bus interface to replace a predetermined default common geographical address, at power on/reset and periodically during operation, in a systematic manner, employing a logical hierarchical view, the unique geographical address being reflective of the one or more bus signal distributors and the one or more bus interfaces' topological positions in the serial bus assembly;

each of the bus signal distributors/bus interfaces is initialized to the predetermined default common geographical address at power on/reset, whereas each of the bus signal distributors enabling only an upstream port and disabling all other ports at power on/reset.

11. The computer system bus controller as set forth in claim 10, wherein said circuitry and complementary logic comprises first control circuitry and complementary logic for assigning a unique geographical address to a bus interface, upon detecting the bus interface, determining how many functions are supported by a peripheral hosting the bus interface, and assigning a unique logical address to each of the functions, upon assigning a unique geographical address to the bus interface.

12. The computer system bus controller as set forth in claim 11, wherein, said circuitry and complementary logic further comprises second control circuitry and complementary logic for systematically instructing the disabled ports of a bus signal distributor to be enabled, one port at a time, detecting if a bus interface is connected to a port once the port is enabled, and instructing the port to be disabled again if no bus interface is detected, whenever the bus signal distributor is detected.

13. A computer system bus signal distributor comprising:

a plurality of ports including a first port, the first port being used to couple the bus signal distributor upstream to either another bus signal distributor or the bus controller, and the remaining ports being used to couple lower level bus interfaces or other lower level bus signal distributors upstream to the bus signal distributor;

first circuitry for initializing the bus signal distributor with a predetermined default common geographical address at power on/reset, and for subsequently replacing the common geogaphical address with a unique geographical address assigned by the bus controller; the unique geographical address being reflective of the bus signal distributor's topological position in the serial bus assembly; and second circuitry coupled to the ports and to the first circuitry for automatically enabling the first port and disabling all other ports at power on/reset, and for selectively enabling the other ports responsive to commands addressed to the bus signal distributor by the bus controller.

14. A bus interface for coupling a peripheral to a system unit through zero or more bus signal distributors and a bus controller, the bus interface comprising:

first circuitry for self-initializing the bus interface with a predetermined default common geographical address at power on/reset, and for subsequently replacing the common geographical address with a unique geographical address assigned by the bus controller, the unique geographical address being reflective of the bus interface's topological position in the serial bus assembly;

second circuitry coupled to the first circuitry and to the bus controller through the zero or more bus signal distributors for accepting an geographical address assignment by the bus controller, each of the bus signal distributor enabling an upstream port and disabling all other ports at power on/reset, and then enabling the disabled ports, one at a time, at the instruction of the bus controller; and third circuitry coupled to the second circuitry and to the bus controller through the zero or more bus signal distributors for facilitating at least one logical address assignment by the bus controller to at least one function of the peripheral.

* * * * *

UNITED STATES PATENT AND TRADEMARK OFFICE
CERTIFICATE OF CORRECTION

PATENT NO. : 5,623,610
DATED : April 22, 1997
INVENTOR(S) : Knoll et al.

It is certified that error appears in the above-identified patent and that said Letters Patent is hereby corrected as shown below:

In column 5 at line 24 delete "Isochrononous" and insert --Isochronous--

In column 10 at line 4 insert --24.-- following "ports" and prior to "Port"

In column 16 at line 12 delete "enable," and insert --enabled,--

Signed and Sealed this

Twelfth Day of August, 1997

Attest:

BRUCE LEHMAN

Attesting Officer

Commissioner of Patents and Trademarks